(12) United States Patent
Fischer et al.

(10) Patent No.: US 11,691,586 B2
(45) Date of Patent: Jul. 4, 2023

(54) SEATBELT AIRBAG

(71) Applicant: ZF Passive Safety Systems US Inc., Washington, MI (US)

(72) Inventors: Kurt Fischer, Rochester, MI (US); Emiliano Core Almarza, Valladolid (ES); Alexandra Smith, Richmond, MI (US); Luis Felipe Blanca Téllez, Valladolid (ES); Antonio Zocco, Villarbasse (IT); Andrea Rabito, Roletto (IT)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/313,244

(22) Filed: May 6, 2021

(65) Prior Publication Data
US 2022/0355755 A1    Nov. 10, 2022

(51) Int. Cl.
*B60R 21/18* (2006.01)
*B60R 21/01* (2006.01)

(52) U.S. Cl.
CPC ............. *B60R 21/18* (2013.01); *B60R 21/01* (2013.01); *B60R 2021/01286* (2013.01)

(58) Field of Classification Search
CPC ................... B60R 21/18; B60R 21/01; B60R 2021/01286
See application file for complete search history.

(56) References Cited

U.S. PATENT DOCUMENTS

| | | |
|---|---|---|
| 3,706,462 A | 12/1972 | Lilly |
| 5,597,178 A | 1/1997 | Hardin, Jr. |
| 5,871,230 A * | 2/1999 | Lewis ................ B60R 22/14 280/743.1 |
| 6,131,949 A | 10/2000 | Lewis et al. |
| 6,168,198 B1 * | 1/2001 | Breed ................ B60N 2/002 701/45 |
| 6,209,908 B1 * | 4/2001 | Zumpano ........... B60R 21/2072 280/730.1 |
| 6,352,282 B2 | 3/2002 | Hirose |
| 6,378,898 B1 * | 4/2002 | Lewis ................ B60R 21/18 280/739 |

(Continued)

FOREIGN PATENT DOCUMENTS

| | | |
|---|---|---|
| DE | 102015204099 A1 | 9/2016 |
| JP | 5672222 B2 * | 2/2015 |

OTHER PUBLICATIONS

Machine Translation of DE102015204099 (Year: 2016).*

(Continued)

*Primary Examiner* — Paul N Dickson
*Assistant Examiner* — Kurtis Nielson
(74) *Attorney, Agent, or Firm* — Tarolli, Sundheim, Covell & Tummino L.L.P.

(57) ABSTRACT

A vehicle safety system for helping to protect an occupant of a vehicle seat includes a seatbelt extensible around the occupant to help restrain the occupant in the vehicle seat. The seatbelt includes a lap belt configured to extend across the occupant at the hips. An airbag is secured to the lap belt and configured to inflate and deploy upward from the lap belt to a deployed position in front of the occupant. The system is configured to adjust the deployed position of the airbag in response to the position of the occupant.

33 Claims, 11 Drawing Sheets

(56) References Cited

U.S. PATENT DOCUMENTS

| | | | |
|---|---|---|---|
| 6,439,600 B1* | 8/2002 | Adkisson | B60R 21/18 280/743.1 |
| 6,443,487 B1* | 9/2002 | Suyama | B60R 21/18 280/733 |
| 6,452,870 B1* | 9/2002 | Breed | B60R 21/0152 367/99 |
| 6,523,856 B2 | 2/2003 | Braun et al. | |
| 6,692,020 B2 | 2/2004 | Decomps et al. | |
| 7,665,761 B1* | 2/2010 | Green | B60R 21/233 280/730.2 |
| 7,980,590 B2* | 7/2011 | Foubert | B60R 21/18 280/801.1 |
| 8,585,084 B1* | 11/2013 | Schneider | B60R 21/18 280/743.2 |
| 8,672,347 B2 | 3/2014 | Schneider et al. | |
| 9,517,744 B2 | 12/2016 | Shimazu | |
| 9,925,950 B2 | 3/2018 | Moeller et al. | |
| 2003/0234524 A1* | 12/2003 | Roychoudhury | B60R 21/01548 280/735 |
| 2004/0178614 A1* | 9/2004 | Countryman | B60R 21/18 280/743.1 |
| 2006/0028004 A1* | 2/2006 | Oota | B60R 21/231 280/733 |
| 2006/0090946 A1* | 5/2006 | Zhao | B60R 22/02 180/268 |
| 2009/0179406 A1* | 7/2009 | Haraoka | B60R 21/18 280/733 |
| 2009/0236828 A1* | 9/2009 | Foubert | B60R 21/18 280/733 |
| 2015/0069741 A1* | 3/2015 | Shimazu | B60R 21/233 280/729 |
| 2017/0225788 A1* | 8/2017 | Humbert | B60R 21/233 |
| 2019/0283699 A1 | 9/2019 | Park | |
| 2019/0299899 A1 | 10/2019 | Einarsson et al. | |
| 2019/0344743 A1 | 11/2019 | Jaradi et al. | |
| 2020/0180537 A1* | 6/2020 | Choi | B60R 21/21 |
| 2020/0353886 A1 | 11/2020 | Robertson et al. | |
| 2021/0094496 A1 | 4/2021 | Tanaka et al. | |
| 2021/0094504 A1* | 4/2021 | Tanaka | B60R 21/23138 |
| 2021/0300277 A1* | 9/2021 | Fukaura | B60R 21/2338 |
| 2021/0300278 A1* | 9/2021 | Hayashi | B60R 21/18 |

OTHER PUBLICATIONS

PCT International Search Report and Written Opinion for corresponding International Application Serial No. PCT/US2022/027570, dated Jul. 26, 2022, pp. 1-16.

* cited by examiner

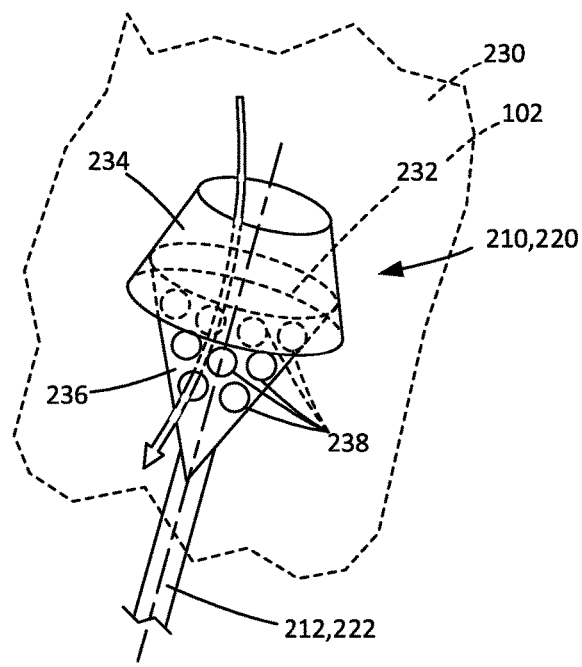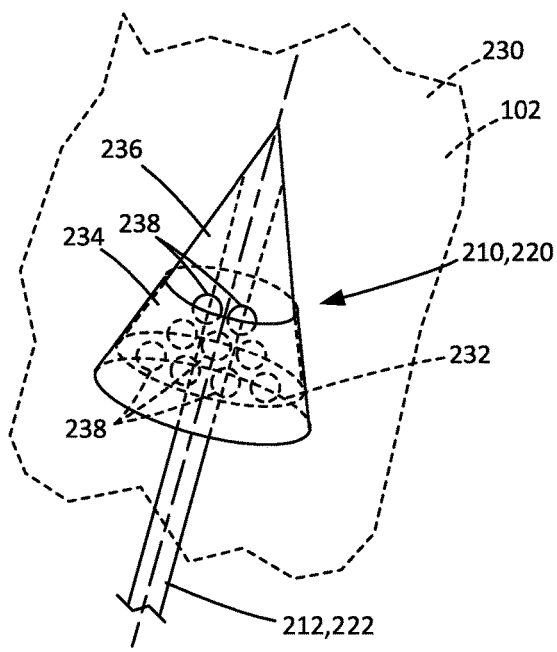
FIG. 15A    FIG. 15B
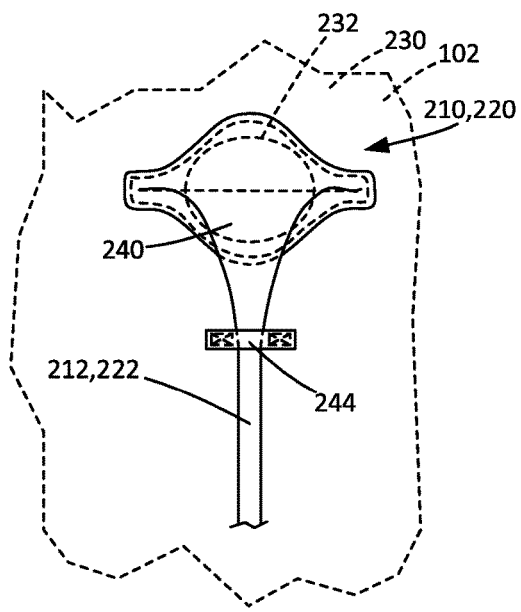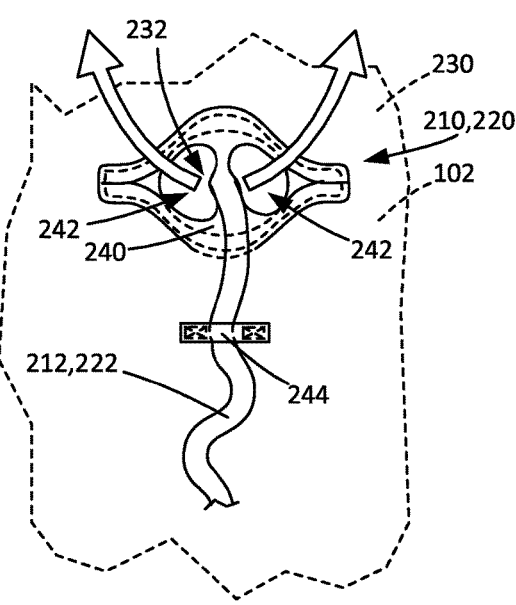
FIG. 16A    FIG. 16B

SEATBELT AIRBAG

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags may be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the structure traditionally relied upon for supporting various vehicle safety devices.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner. Vehicle manufacturers are free utilize passenger cabin space as they see fit without being constrained to predetermined passenger arrangements, such as all forward-facing occupants, or vehicle structural configurations, such as steering wheel/instrument panel configurations, center console configurations, foot well pedal controls, etc.

This presents the challenge of not only where to locate airbag systems, but also finding a reaction surface against which to position the airbag so that it can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In the autonomous vehicles, however, the vehicle may not have an instrument panel or steering wheel at all, and the occupants can be positioned and oriented outside the traditional manner. This can make it difficult or impossible to utilize traditional structures in the vehicle as reaction surface.

SUMMARY

An apparatus for helping to protect an occupant of a vehicle seat includes an airbag mounted to a lap belt portion of a seatbelt associated with the seat. The airbag is deployable in front of the occupant and is configured to deploy into the lap space where the occupant's upper legs meet the torso, i.e., in the area of the occupant's hips. This configuration is advantageous because it uses the occupant's legs as a reaction surface for the airbag. Securing the airbag to the lap belt maintains its position in the lap space. When a vehicle collision occurs and the airbag is deployed, the lap belt secures the occupant in the seat at the hips. The occupant bends forward at the hips, and the occupant's head and torso move toward the upper legs and into engagement with the airbag. The airbag, being secured to the lap belt and retained in the lap space, uses the upper legs, supported on the seat, as a reaction surface, which allows the bag to cushion the occupant and provide a desired ride-down effect.

The lap belt can be a portion of a seatbelt having a three-point configuration. In this configuration, a single length of seatbelt is paid-out and retracted by a seatbelt retractor, which ensures a close fit with the occupant. From the retractor, the seatbelt webbing passes through a shoulder ring on the vehicle side structure, though a seatbelt tongue, and to a seatbelt anchor positioned on the same side of the vehicle seat as the retractor, which positions the entire seatbelt on one side of the vehicle seat when in an unused condition. To use the seatbelt, grasping the seatbelt tongue, the seated occupant draws the seatbelt across the seat and across the occupant's body, and latches the tongue in a seatbelt buckle anchored to the vehicle on the opposite side of the seat. In the buckled condition, a shoulder belt portion extends from the shoulder ring to the seatbelt tongue, and the lap portion extends from the seatbelt tongue to the seatbelt anchor.

With the three-point seatbelt configuration, the retractor pays out more seatbelt webbing for larger occupants, and retracts seatbelt webbing for smaller occupants, thus ensuring a snug fit of both the lap belt portion and the shoulder belt portion of the seatbelt. It can thus be seen that the portion of the seatbelt webbing that extends across the occupant's lap and thereby forms the lap belt portion varies according to occupant size. Because the airbag is fixed to the seatbelt webbing, the position of the airbag relative to the occupant also varies according to occupant size. Accordingly, the airbag configurations disclosed herein can be configured to adapt their positions to the size of the seated occupant and the resulting position of the lap belt portion that supports the airbag.

According to one aspect, a vehicle safety system for helping to protect an occupant of a vehicle seat includes a seatbelt extensible around the occupant to help restrain the occupant in the vehicle seat. The seatbelt includes a lap belt configured to extend across the occupant at the hips. An airbag is secured to the lap belt and configured to inflate and deploy upward from the lap belt to a deployed position in front of the occupant. The system is configured to adjust the deployed position of the airbag in response to the position of the occupant.

According to another aspect, the airbag can be connected to the lap belt at a position associated with a normal sized occupant, the system being configured to adjust the deployed position of the airbag in response to detecting a small occupant or a large occupant. The normal size occupant can be a 50% male occupant, the small occupant can be a 5% female occupant, and the large occupant can be a 95% male occupant.

According to another aspect, the system can include an inflator for inflating the airbag, a sensor for sensing the occurrence of an event for which airbag deployment is desired, and a controller operatively connected to the sensor and the inflator. The controller can be configured to actuate the inflator in response to the sensor sensing the occurrence of the event for which airbag deployment is desired. The controller can be further configured to control the operation of an actuatable device to adjust the deployed position of the airbag in response to the size of the occupant.

According to another aspect, the safety system can also include one or more devices configured to detect the size of the occupant directly or indirectly and provide an indication of detected occupant size to the controller. A camera system can be configured to evaluate the size of the occupant and provide an indication of detected occupant size to the controller. A sensor can be configured to sense seatbelt webbing payout and retraction from a seatbelt retractor, to evaluate the size of the occupant based on seatbelt webbing payout and retraction, and to provide an indication of occupant size to the controller.

According to another aspect, the actuatable device can be a positioning chamber inflatable between the airbag and the lap belt to adjust the deployed position of the airbag. The positioning chamber can be configured to inflate between the airbag and the lap belt at a lateral position to cause the airbag to rotate relative to the occupant. In this respect, a first positioning chamber can be configured to inflate between the airbag and the lap belt at a lateral position to cause airbag to rotate in a first direction relative to the occupant. A second positioning chamber can be configured to inflate between the airbag and the lap belt at a lateral position to cause airbag to rotate in a second direction, opposite the first direction, relative to the occupant. The first positioning chamber can be configured to rotate the airbag in the first direction in response to a small occupant of the vehicle seat, and the second positioning chamber can be configured to rotate the airbag in the second direction in response to a large occupant of the vehicle seat.

According to another aspect, the positioning chamber can be configured to inflate between the airbag and the lap belt to cause airbag to rotate rearward toward a seatback of the vehicle seat in response to the seatback being in a reclined position.

According to another aspect, the actuatable device can include an actuatable tether that connects a base portion of the airbag to the lap belt to maintain pleats in a base portion of the airbag. The tether can be actuatable to release the pleats to unfold in response to airbag inflation, which causes the airbag to move relative to the lap belt to adjust the deployed position of the airbag. The tether can be configured to connect a lateral portion of the base portion to the lap belt, the tether being actuatable to extend its length, which releases the pleats adjacent the lateral portion to rotate the airbag relative to the occupant.

According to this aspect, a first tether can be configured to connect a first lateral portion of the base portion to the lap belt, and a second tether can be configured to connect a second lateral portion of the base portion, opposite the first lateral portion, to the lap belt. The first tether can be actuatable to extend its length, which releases the pleats at the first lateral portion so that the airbag rotates in a first direction relative to the occupant. The second tether can be actuatable to extend its length, which releases the pleats at the second lateral portion so that the airbag rotates in a second direction, opposite the first direction, relative to the occupant. The first tether can be configured to rotate the airbag in the first direction in response to a small occupant of the vehicle seat, and the second tether is configured to rotate the airbag in the second direction in response to a large occupant of the vehicle seat.

According to another aspect, the vehicle safety system can also include an actuatable seatbelt retractor actuatable to payout and retract seatbelt webbing in response to the controller. The vehicle safety system can also include an actuatable seatbelt anchor for anchoring an end of the seatbelt webbing to the vehicle. The actuatable seatbelt anchor can be actuatable to adjust its position relative to the vehicle seat. The vehicle safety system can further include an actuatable seatbelt latch for receiving a seatbelt buckle to secure the lap belt and shoulder belt extending across the vehicle. The actuatable seatbelt latch can be actuatable to adjust its position relative to the vehicle seat. The controller can be configured to control the actuatable seatbelt retractor, seatbelt anchor, and seatbelt latch to position the airbag in response to the occupant size so that the airbag is centered with respect to the occupant. According to this aspect, the actuatable seatbelt anchor and actuatable seatbelt latch can be anchored to the vehicle on opposite sides of the vehicle seat and can be actuatable to adjust their respective heights relative to the seat to adjust the position of the lap belt and the airbag secured thereto.

According to another aspect, the airbag can include a base portion secured to the lap belt and an upper portion opposite the base portion. The upper portion can be configured to be positioned for receiving a head and upper torso of the occupant when in the deployed position. The upper portion can include chambers that extend from the upper portion and define a pocket configured to receive an obliquely moving occupant and maintain the position of the airbag so that it covers the occupant despite the oblique occupant movement.

According to another aspect, the airbag can also include a vent configured to vent inflation fluid from the airbag. The vent can be configured for active or passive actuation. The vent can have a normally-closed, actuate to open configuration or a normally-open, actuate to close configuration.

According to another aspect, the airbag can be configured to extend vertically above the seat to a position configured to receive the occupant's head when bending forward in response to a vehicle crash. The airbag can have a tapered configuration with a widened base at the connection to the lap belt and a narrowed upper portion configured to receive the occupant's head. The base portion can be configured to engage and become pressed against the occupant's legs due to the forward bending of the occupant into engagement with the upper portion of the airbag. The connection of the base portion to the lap belt can maintain the base portion engaging the occupant's legs and lower torso so that the occupant's legs, supported by a bottom cushion and base of the vehicle seat, act as a reaction surface for supporting the airbag against the impacting occupant.

According to another aspect, the vehicle safety system can include an internal tether that interconnects an inner surface of an impact panel of the airbag to an inner surface of an outer panel of the airbag. The impact panel can be configured to receive the impacting occupant, with the outer panel being spaced from and having an outer surface facing away from the occupant. The tether can be configured to limit bulging of the outer panel away from the occupant in order to cause impact forces of the occupant to urge the airbag into engagement with the occupant's legs, which acts as a reaction surface for supporting the airbag against the impacting occupant.

DRAWINGS

The foregoing and other features will become apparent to one skilled in the art to which this disclosure relates upon consideration of the following description with reference to the accompanying drawings, in which:

FIGS. 15A and 15B are schematic illustrations depicting non-actuated and actuated conditions, respectively, of a portion of the apparatus, according to another example configuration.

FIGS. 16A and 16B are schematic illustrations depicting non-actuated and actuated conditions, respectively, of a portion of the apparatus, according to another example configuration.

DESCRIPTION

Figure 1:
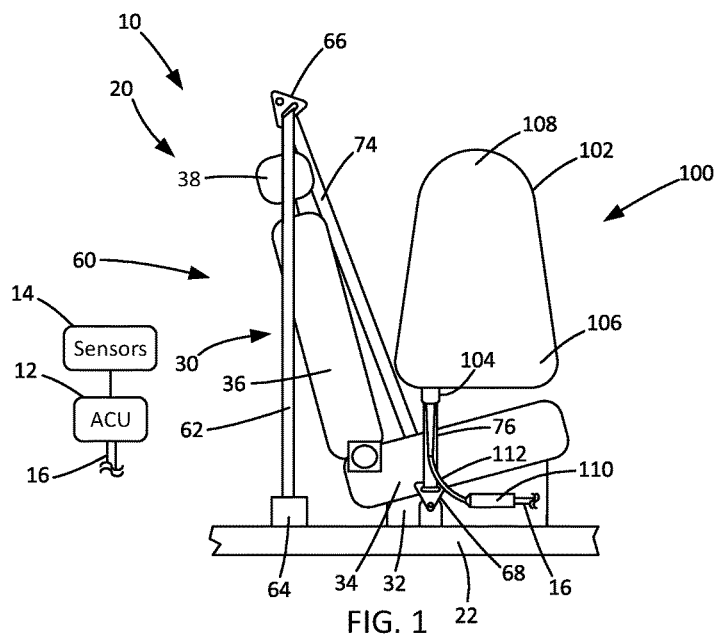
FIG. 1 is a schematic illustration depicting an apparatus for helping to protect an occupant of a vehicle, according to an example configuration.

A vehicle safety system 10 helps protect an occupant of a vehicle 20. Referring to FIG. 1, the vehicle 20 includes a vehicle seat 30 for supporting a vehicle occupant 40 (see, e.g., FIGS. 3A-4B) in a seated position. The vehicle seat 30 includes a base 32 connected to the vehicle 20, e.g., to the floor 22. The seat base 32 supports a seat bottom cushion 34. A seatback 36 extends upward from the seat bottom 34 and has a reclined position that can be adjusted. A headrest 38 is positioned at an upper end of the seatback 36.

Seatbelt

The safety system 10 also includes an occupant restraint in the form of a seatbelt system that is referred to herein as a seatbelt 60. As shown in the example configuration of FIG. 1, the seatbelt 60 can have a three-point configuration. In this configuration, a single length of seatbelt webbing 62 has a first end connected to a retractor 64, which is mounted to the vehicle 20 on a first lateral side of the seat 30. The retractor 64 can, for example, be mounted to the side structure (e.g., a side pillar), to the floor 22, or to the seat 30 (e.g., to the seatback 36).

From the retractor 64, the seatbelt webbing 62 passes through a shoulder ring 66 mounted to the vehicle 20, also on the first lateral side of the seat 30. The shoulder ring 66 can, for example, be mounted to the side structure (e.g., a side pillar), to the floor 22, or to the seat 30 (e.g., to the seatback 36). From the shoulder ring 66, the seatbelt webbing 62 extends to an anchor 68 mounted to the vehicle 20, also on the first lateral side of the seat 30. The anchor 68 can, for example, be mounted to the side structure (e.g., a side pillar), to the floor 22, or to the seat 30 (e.g., on the seat base 32).

The seatbelt 60 also includes a tongue assembly or tongue 70 (see, FIG. 5A) through which the seatbelt webbing 62 extends. The tongue 70 is slidable along the seatbelt webbing 62. The tongue 70 allows the occupant 40 to draw the seatbelt webbing 62 across the seat 30 so as to extend from the shoulder ring 66 across the occupant's torso to a seatbelt buckle assembly 72, which is mounted to the vehicle 20. The buckle assembly 72 can, for example, be mounted to a central tunnel of the vehicle, to the floor 22, or to the seat 30 (e.g., on the seat base 32). The length of webbing 62 extending from the shoulder ring 66 to the tongue 70, latched in the buckle 72, defines a shoulder portion 74 of the seatbelt 60. The length of seatbelt webbing 62 extending from the tongue 70, latched in the buckle 72, to the anchor 68, defines a lap portion 76 of the seatbelt 60.

From the above, it will be appreciated that the seatbelt 60 can have a configuration in which the retractor 64, shoulder ring 66, and anchor 68 all are mounted to the vehicle seat 30. This particular example configuration could be advantageous in that it permits the seat 30 to be installed in the vehicle 20 at a desired position and orientation without regard to is proximity to any particular vehicle structure. This self-contained seatbelt implementation can, for example, be beneficial in an autonomous vehicle where the seats 30 might not necessarily be forward facing with one side positioned adjacent the vehicle side structure. The seats 30 could, for example, be rear facing or side facing.

The retractor 64 is configured to pay-out and retract the seatbelt webbing 62 in order to ensure a close fit with the occupant 40. Because occupants can be of various shapes and sizes, the amount of seatbelt webbing 62 paid out or retracted into the retractor 64 varies. Along with this, the respective lengths of the shoulder portion 74 and lap portion 76 also vary. It can therefore be seen that the particular portion of the seatbelt webbing 62 forming the shoulder portion 74 and lap portion 76 also varies according to the specifics, i.e., size, shape, weight, etc., of the person occupying the seat 30.

Airbag Module

The safety system 10 also includes an airbag module 100 mounted on the lap portion 76 of the seatbelt 60. The airbag module 100 includes an airbag 102 and a cover 104 that encloses the airbag in a packaged condition in which the airbag is rolled and or folded. The mounting of the airbag module 100 to the lap portion 76 can be achieved in a variety of manners. For example, the airbag 102 and/or the cover 104 could be stitched to the seatbelt webbing 62 of the lap portion 76.

Figure 2:
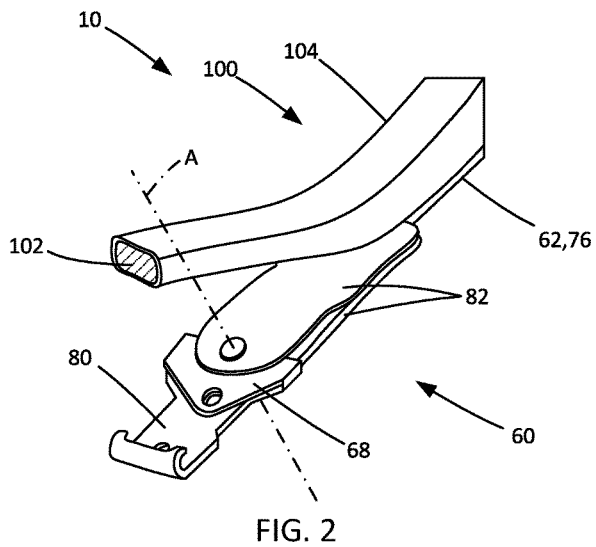
FIG. 2 is a schematic illustration of a portion of the apparatus of FIG. 1.

As shown in FIGS. 1 and 2, the airbag module 100 is secured to the lap portion 76 of the seatbelt webbing 62 and extends toward or in the proximity of the anchor 68. The anchor 68 can include a fastening bracket 80 for anchoring the anchor to the vehicle 20 at any of the aforementioned locations. The seatbelt webbing 62 can be sandwiched between anti-twist plates 82, which are fixed to the anchor 68 in a manner such that the assemblage of the anti-twist plates, seatbelt webbing 62, and airbag module 100 can pivot or rotate about an axis A.

An inflator 110 is configured to provide inflation fluid for inflating and deploying the airbag 102 from the stored condition (FIG. 2) to the inflated and deployed condition (FIG. 1). The inflator 110 can be connected to the airbag 102 directly, or a conduit or fill tube 112 can direct inflation fluid from the inflator to the airbag. The fill tube 112 can be flexible so as to allow the lap portion 76 to move, e.g., pivot, about the axis A (see FIG. 2). The inflator 110 and fill tube 112 can be components of the airbag module 100 configured for installation as a unit, or they can be separate components installed separately and connected in situ to the airbag 102.

The airbag 102 can be constructed of any suitable material, such as nylon (e.g., woven nylon 6-6 yarns), and can be constructed in any suitable manner. For example, the airbag 102 can include one or more pieces or panels of material. If more than one piece or panel is used, the pieces or panels can be interconnected by known means, such as stitching, ultrasonic welding, heat bonding, or adhesives, to form the airbag 102. The airbag 102 can be uncoated, coated with a material, such as a gas impermeable urethane, or laminated with a material, such as a gas impermeable film. The airbag 102 thus can have a gas-tight or substantially gas-tight construction. Alternative materials, such as polyester yarn, and alternatives coatings, such as silicone, can also be used to construct the airbag 102.

The safety system 10 includes an airbag controller unit (ACU) 12 that communicates with sensors 14 to detect the occurrence of an event, such as a vehicle collision, for which inflation of the airbag 102 is desired. Upon sensing, via the sensors 14, the occurrence of an event for which inflation of the airbag 102 is desired, the ACU 12 provides a deployment signal to the inflator 110 via lead wires 16. Upon receiving the signal from the ACU 12, the inflator 110 is actuated and provides inflation fluid to the airbag 102. The inflating airbag exerts a force on the cover 104, which causes the cover to open. This can be facilitated, for example, by fitting the cover 104 with a tear seam.

The airbag 102 inflates and deploys from the stored condition in the cover 104 to the deployed condition illustrated in FIG. 1. The airbag 102, while inflated, helps protect the vehicle occupant 40 by cushioning impacts with the occupant and providing a desired ride down effect.

The Seated Occupant

Figure 3A:
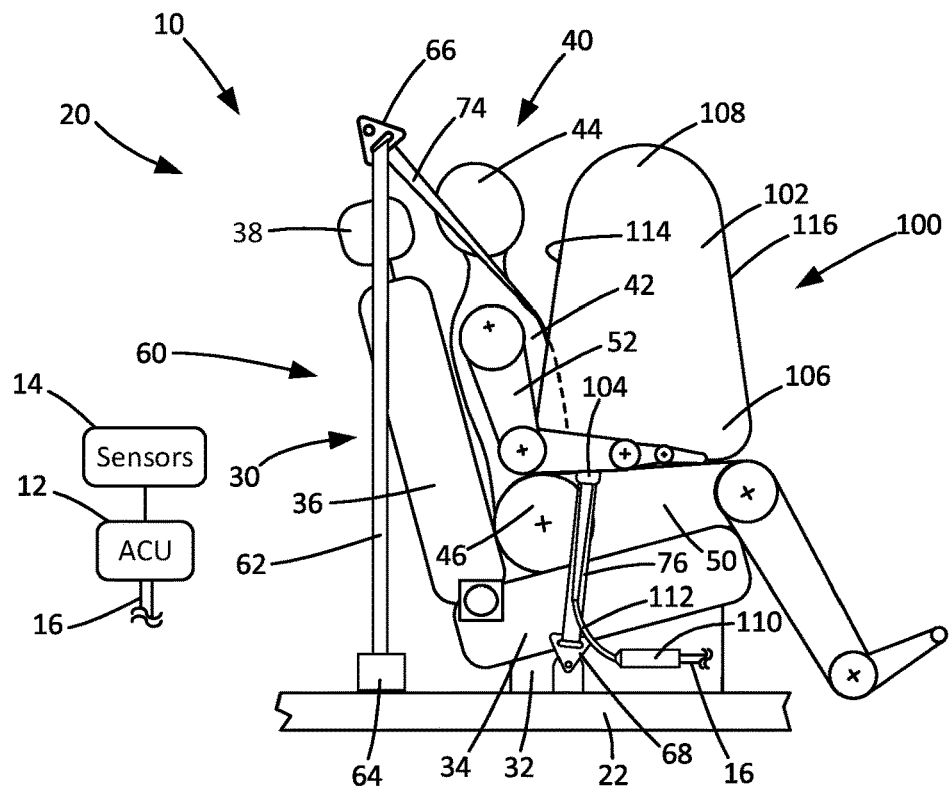
FIGS. 3A and 3B are schematic illustrations depicting deployed conditions of the apparatus, according to an example configuration.

FIG. 3A illustrates the occupant 40 in a normally seated condition with the inflated airbag 102 deployed. In the normally seated condition, the occupant 40 is seated on the seat 30, with his/her torso 42 leaned back against the seatback 36. The occupant's head 44 is positioned at or near the headrest 38, and hips/buttocks 46 and legs 50 (more specifically upper legs) resting on the seat bottom cushion 34. The lap belt portion 76 of the seatbelt 60 maintains the hips/buttocks 46 rearward on the seat base 32 at the intersection with the seat back 36. The occupant's lower legs extend from the knee, which is bent at the front edge of the bottom cushion 34 downward toward the vehicle floor 22, where the occupant's feet rest. The occupant's legs would eventually flex at the knee and the lower legs would kick forward in response to the collision. In the typical occupant position of FIG. 3A, the occupant's arms 52 are at his/her side, bent at the elbows with the lower arms/forearms and hands resting on the legs 50. The arms 52 would also eventually extend/mover forward in response to the collision.

Safety System Function

The airbag 102 can be shaped and configured according to several factors, such as the specific vehicle 20 and/or seat 30 architecture in which the airbag module 100 is installed. Characteristics such as the width, height, depth, and chamber configuration of the airbag 102 can be selected in view of vehicle 20 and/or seat 30 architectural considerations, such as cabin space (e.g., height, width, etc.), seating position (e.g., driver, passenger, front seat, rear seat), seat direction (e.g., forward-facing, rearward-facing, side-facing), spacing between seats, and surrounding vehicle structure (e.g., instrument panel, steering wheel, seatback of a forward row seat, etc.).

Figure 3B:
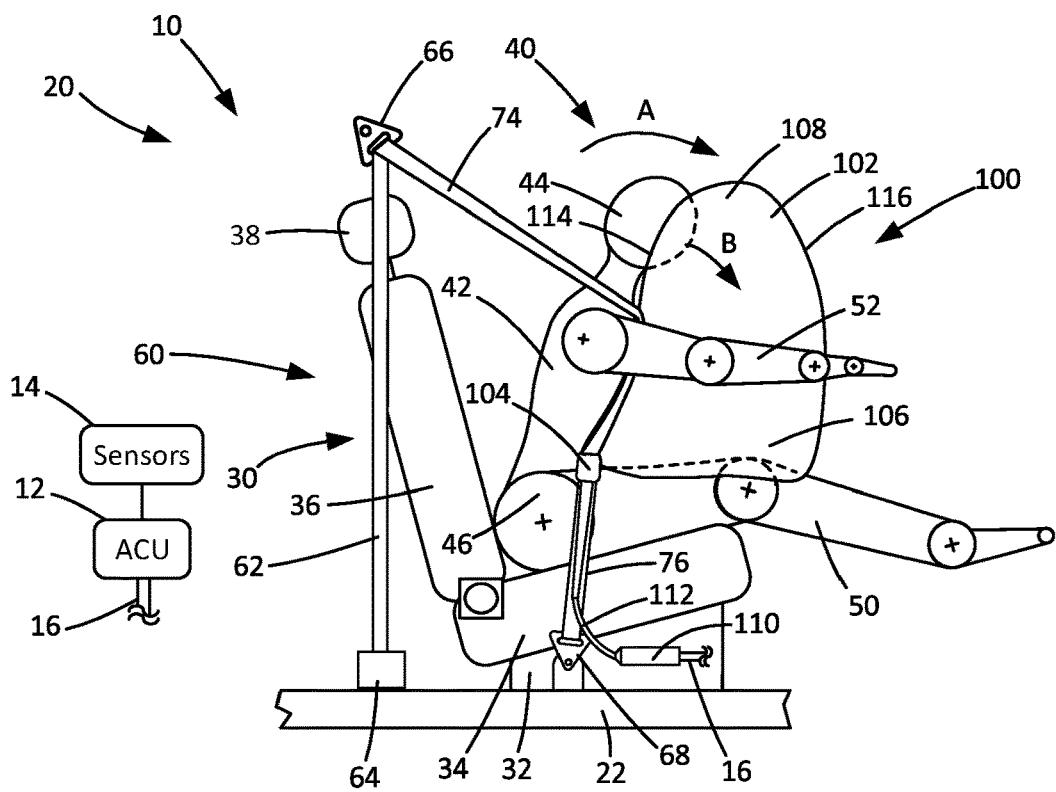

The airbag 102 illustrated in FIGS. 3A and 3B has a generally rounded, tapered configuration with a widened base portion 106 and a narrowed upper portion 108. The base portion 106 is configured to engage the upper legs 50 of the occupant 40 and wedge into the area where the hips 46 and torso 42 meet. The connection of the airbag 102 to the lap belt 76 enforces and maintains this positioning of the base portion 106.

When a vehicle crash occurs, the occupant 40, restrained by the seatbelt 60, bends forward at the hips 46 and the torso 42 and head 44 move into engagement with the surface of an impact panel 114 of the airbag 102, which faces the occupant, as indicated generally by the arrow labeled A in FIG. 3B. The upper portion 108 is configured to receive the upper torso 42 and head 44 of the occupant 40 as the occupant bends forward at the hips 46 in response to the vehicle collision. The upper portion 108 cushions the occupant 40 and absorbs the impact energy, providing a more controlled deceleration that can be referred to as a desired ride-down effect.

The occupant's hips 46 and legs 50, supported by the seat 30, act as a reaction surface for supporting the airbag 102 so that it can absorb the impact forces of the impacting occupant 40. When a vehicle impact occurs and the occupant 40 bends at the hips 46 into engagement with the deployed airbag 102, the lap belt 76 maintains the base portion 106 positioned/wedged on the legs 50 against the hips 46 and lower torso 42. As the occupant 40 continues to bend forward, the position of the base portion 106 is maintained by the lap belt 76, which prevents displacement of the base portion and causes the forward bending to instead compress the airbag 102, as indicated generally by the arrow labeled B in FIG. 3B. This compression urges the upper portion 108 generally downward toward the base portion 106 against the occupant's legs 50, which are supported by the seat 30. As a result, the airbag 102 effective at helping to protect the occupant 40.

Tethered Airbag Configuration

While the configuration and implementation of the airbag module 100 ensures that the base portion 106 of the airbag 102 is maintained in the previously described wedged position at the legs 50, hips 46, torso 42, it will be appreciated that the downward compression exerted on the airbag by the impacting occupant 40 is only a component of the forces exerted on the airbag by the occupant. Because the occupant 40 is bending both forward and downward in response to the crash, the occupant imparts forces on the airbag 102 in a forward direction as well. As a result, while the impact forces are met with reaction forces provided by the legs 50 and seat 30, they also can result in forward bulging of an outer panel 116, opposite the inboard impact panel 114 and facing away from the occupant 40, as shown in FIG. 3A.

While the airbag 102 nevertheless can be highly effective in protecting the occupant 40, the efficiency with which the protection is afforded may not be optimal. By "efficiency," it is meant that the size of the airbag 102, its volume, the required degree of pressurization, and the necessary capacity of the inflator required to provide adequate protection might not be optimal. Larger airbag volumes require higher capacity inflators to produce the volume of inflation fluid necessary to inflate and pressurize the airbag within the required time. Additionally, these factors can scale exponentially, so airbag efficiency can be an important factor in terms of both effectiveness and economy.

Referring to FIGS. 4A-5B, the airbag 102 can include an internal tether 120 for limiting the relative movement of the impact panel 114 and outer panel 116. The tether 120 can be constructed of a material, such as airbag fabric, and can be constructed in a single length or multiple lengths. Opposite ends of the tether 120 are connected to the airbag 102 at connections 122, by known means, such as stitching, ultrasonic welding, heat bonding, adhesives, etc. Connections 122 can also connect the tether 120 can to the airbag 102 at other locations between the ends.

In the example configuration of FIGS. 4A-5B, the tether 120 has four connections 122 with the airbag 102. More specifically, a first, upper end of the tether 120 is connected to the impact panel 114 by a connection 122a located in the area of the occupant's head 44. A second, lower end of the tether 120 is connected to the outer panel 116 by as connection 122b at about mid-torso 42 level. A connection 122c connects the tether 120 to the outer panel 116 at an upper-torso 42 location just below the occupant's head 44. A connection 122d connects the tether 120 to the impact panel 114 at a mid-upper torso 42 location at about the same level vertically as the connection 122b.

Figure 4A:
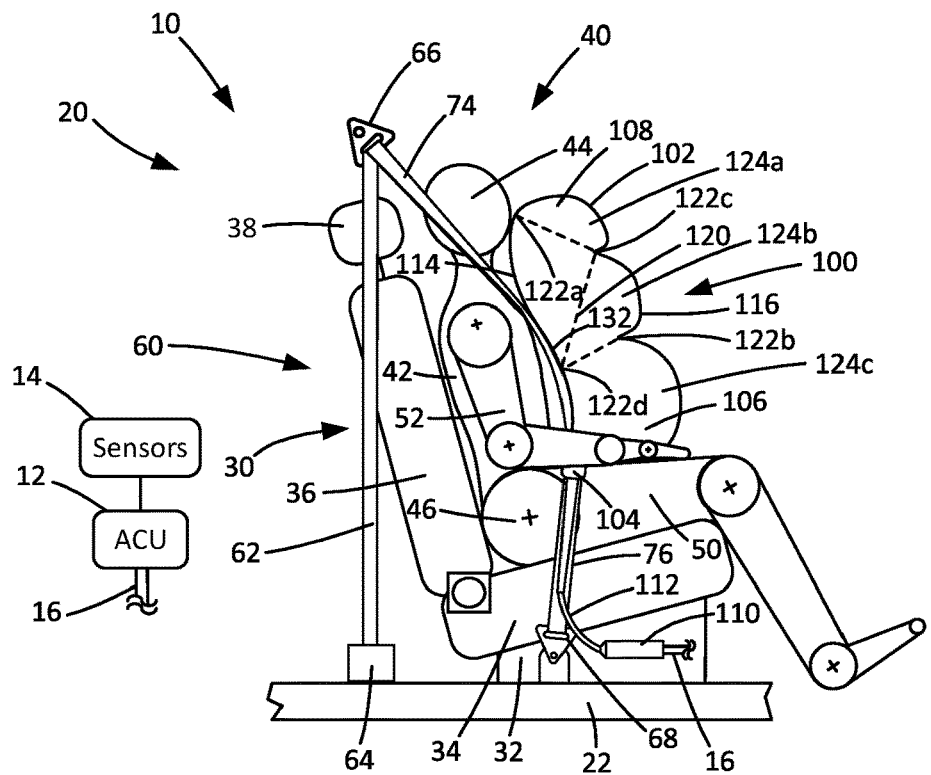
FIGS. 4A and 4B are schematic illustrations depicting deployed conditions of the apparatus, according to another example configuration.
Figure 4B:
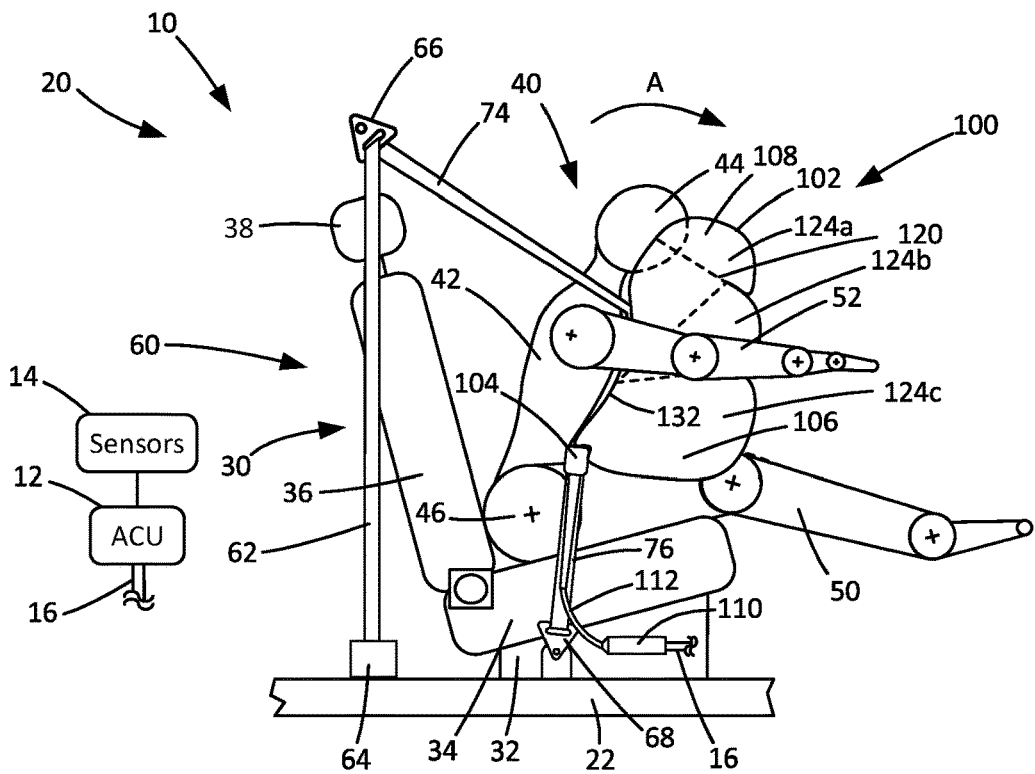

As shown in FIGS. 4A and 4B, the tether 120 has the effect of controlling the inflated shape of the airbag 102 by controlling the movement of the panels 114, 116 relative, e.g., away from, each other. As a result, one or both of the panels 114, 116 can assume a lobed configuration when the airbag 102 is inflated. In the example configuration of FIGS. 4A-5B, lobes 124 are assumed in the outer panel 116. The indentation 132 is formed by tether connection 122d. The indentation 132 reduces the compression of the torso 42 while the shoulder belt 74 provides adequate restraint of the torso 42.

Figure 5A:
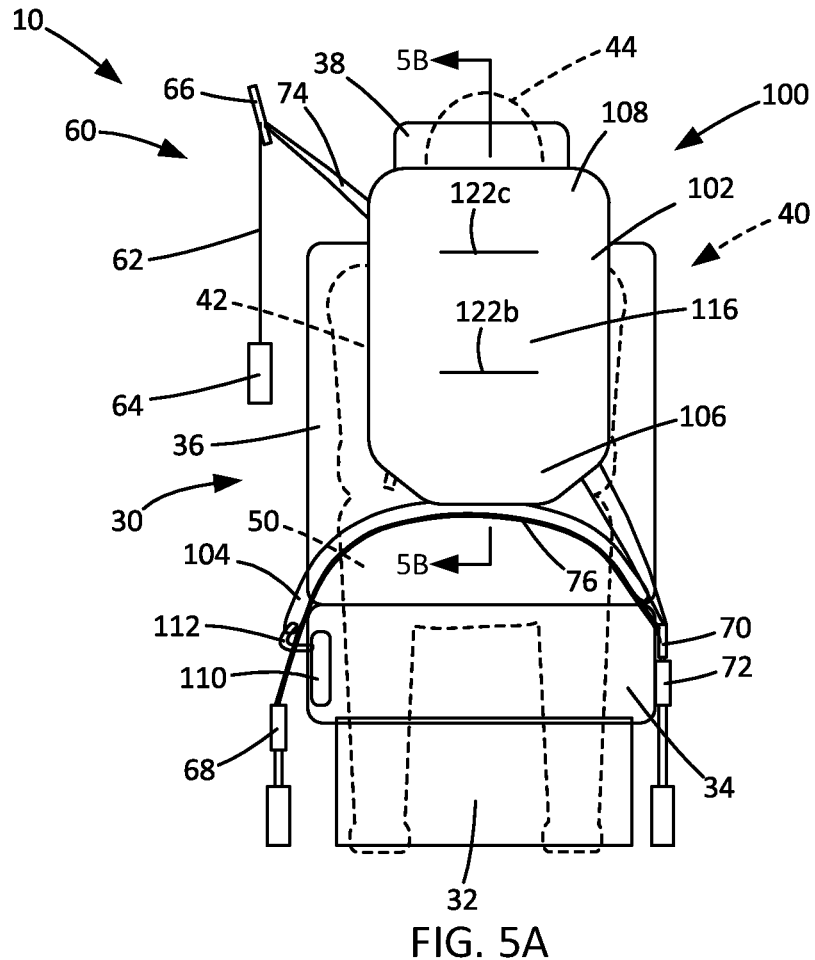
FIGS. 5A and 5B are schematic illustrations depicting an example construction of a portion of the apparatus, according to another example configuration.
Figure 5B:
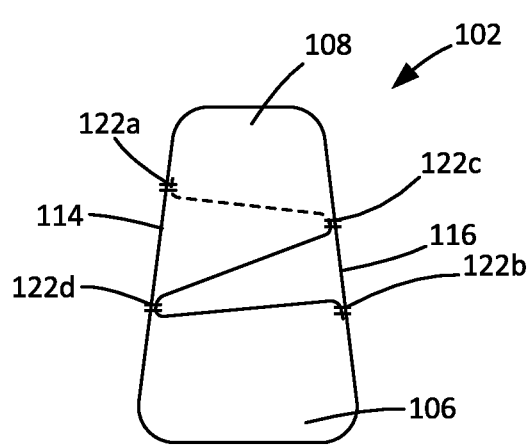

In this example configuration, an upper lobe 124a is defined above the connection 122c with the outer panel 116. A middle lobe 124b is defined between the connections 122c and 122b. A lower lobe 124c is defined beneath the connection 122b. As shown in FIG. 5A, the tether 120 can have a substantial width, measured laterally across the airbag 102. For example, the tether 120 can have a width that is up to half or more of the width of one or both of the panels 114, 116. The tether 120 can therefore be a sheet of material, e.g., airbag material, having a generally elongated rectangular configuration.

When the occupant 40 moves forward about the hips 46, restrained by the lap belt 76, into engagement with the airbag 102, the tether 120 limits the relative movement of the panels 114, 116, thereby controlling the inflated thickness of the airbag. Because relative movement of the panels 114, 116 is so limited, compression of the airbag 102 due to the occupant impact forces cannot result in the outer panel 16 bulging outward, away from the occupant 40. Instead, the occupant impact forces urge the airbag 102 downward against the occupant's legs 50, which are supported by the seat 30 and therefore form a reaction surface for the airbag. Advantageously, the airbag 102 can produce this effect through the incorporation of the tether 120 while, at the same time, limiting the inflated volume of the airbag, which results in a more efficient construction and operation of the airbag module 100. The airbag module 100 can provide the desired degree of occupant protection with a reduced volume airbag 102 and a correspondingly reduced volume inflator 110.

Inflation Port Location

Figure 6:
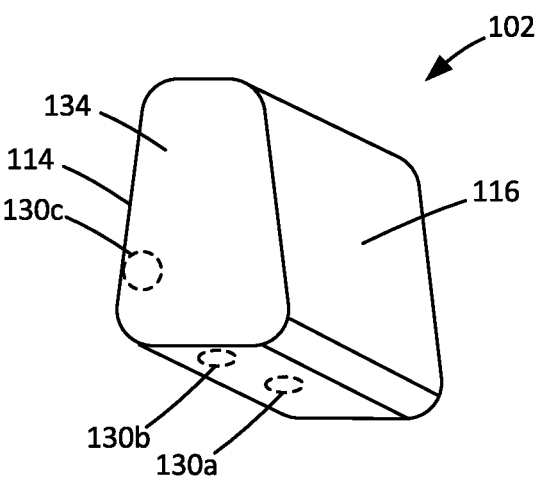
FIG. 6 is a schematic illustration depicting an example construction of a portion of the apparatus, according to another example configuration.

FIG. 6 illustrates various locations for an inflation port 130 of the airbag 102. The location of the inflation port 130 affects the orientation and direction at which inflation fluid enters the inflatable volume of the airbag 102, and therefore can affect airbag deployment characteristics, such as the deployment trajectory and direction, e.g., bottom-up, left-to-right, diagonally up, etc.

FIG. 6 illustrates three example locations for the inflation port 130. A first inflation port 130a is centrally located on a bottom panel 132 of the airbag 102. This port location produces a bottom-up, center-out inflation and deployment of the airbag 102, which is uniform with respect to the occupant 40.

A second inflation port 130b is located at one end of the bottom panel 132. This port location produces a bottom-up, diagonal inflation and deployment of the airbag 102 which, while not uniform with respect to the occupant, can be configured opposite the diagonal direction of the seatbelt shoulder portion 74. This configuration can help counter twisting moments places on the occupant 40 by the diagonally extending shoulder portion 74.

A third inflation port 130c is located on a side panel 134 of the airbag 102 at a location near the impact panel 114 in a lower half to third of the airbag. This location places the port 130c at or near the lap belt 76 in the vicinity of the inflation tube 112, thus providing a quick and direct path through which to direct inflation fluid from the inflator 110 to inflate the airbag 102. This port location produces an inflation/deployment pattern that is a combination of side-to-side, bottom-up, and diagonal, while not uniform with respect to the occupant, can also be configured to account for the diagonal extension direction of the seatbelt shoulder portion 74. As such, this configuration can also help counter twisting moments places on the occupant 40 by the diagonally extending shoulder portion 74.

Airbag Orientation and Centering

With the three-point seatbelt 60, the retractor 64 pays out more seatbelt webbing for larger occupants, and retracts seatbelt webbing for smaller occupants, thus ensuring a snug fit of both the lap belt 76 and the shoulder belt 74 of the seatbelt 60. It can thus be seen that the portion of the seatbelt webbing that extends across the occupant's lap and thereby forms the lap belt 76 varies according to occupant size.

Because the airbag 102 is fixed to the seatbelt webbing, the position of the airbag relative to the occupant also varies according to occupant size. Accordingly, the safety system 10 disclosed herein can include adaptive devices configured to adapt the positions of the airbags to the size of the seated occupant 40 and the resulting position of the lap belt 76 that supports the airbag 102.

The airbag 102 can, for example, be configured to accommodate the physiology of an occupant sized according to National Highway Transportation Safety Administration (NHTSA) guidelines, such as a 50th percentile male occupant, a 95th percentile male occupant, or a 5th percentile female.

In development and testing of vehicle safety systems, manufacturers and safety authorities rely on statistical models and data to help quantify performance criteria and measure system performance. In doing so, reference is made to statistical vehicle occupants that represent the physical characteristics of vehicle occupants for which vehicle safety systems are meant to protect. These statistical occupants include a $50^{th}$ percentile male occupant (50% male), a $95^{th}$ percentile male occupant (95% male), and a $5^{th}$ percentile female occupant (5% female).

The 50% male is derived from statistical values for the U.S. male population. The 50% male has the mean height and weight of the male U.S. population, meaning that roughly half of the U.S. male population is taller/heavier and roughly half of the U.S. male population is shorter/lighter. The 50% male is thus an average or medium sized male occupant.

The 95% male is derived from statistical values for the U.S. male population. The 95% male has the mean height and weight that is taller/heavier than roughly 95% of the male U.S. population, meaning that only roughly 5% of the U.S. male population is taller/heavier and roughly 95% of the U.S. male population is shorter/lighter. The 95% male is thus a large sized male occupant.

The 5% female is derived from statistical values for the U.S. female population. The 5% female has a mean height and weight that, is taller/heavier than only roughly 5% of the U.S. female population. Conversely, this means that roughly 95% U.S. female population is taller/heavier than the 95% female. The 5% female is thus a small female occupant.

Figure 7A:
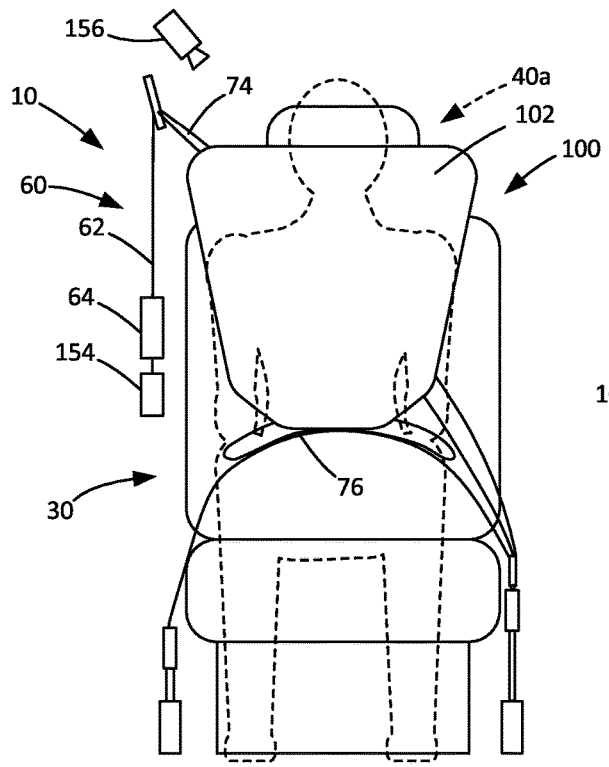
FIGS. 7A-7C are schematic illustrations depicting example deployment conditions of the apparatus, according to another example configuration.
Figure 7B:
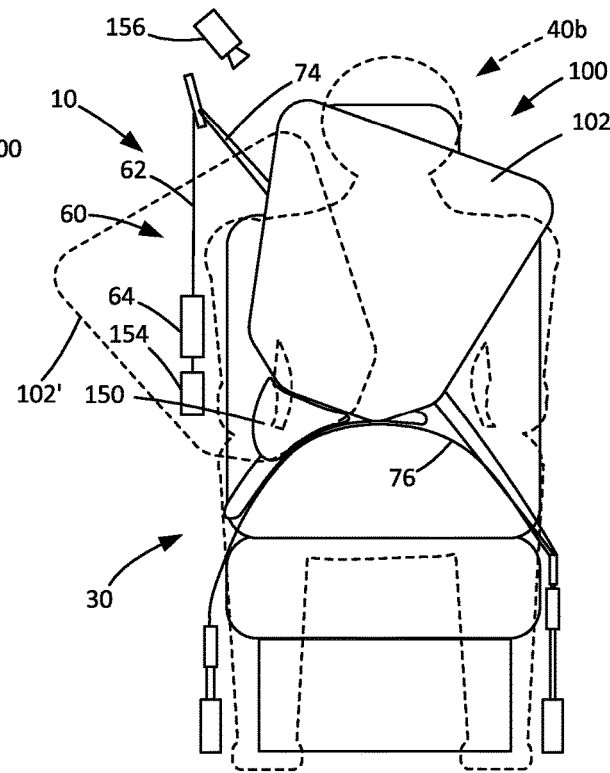
Figure 7C:
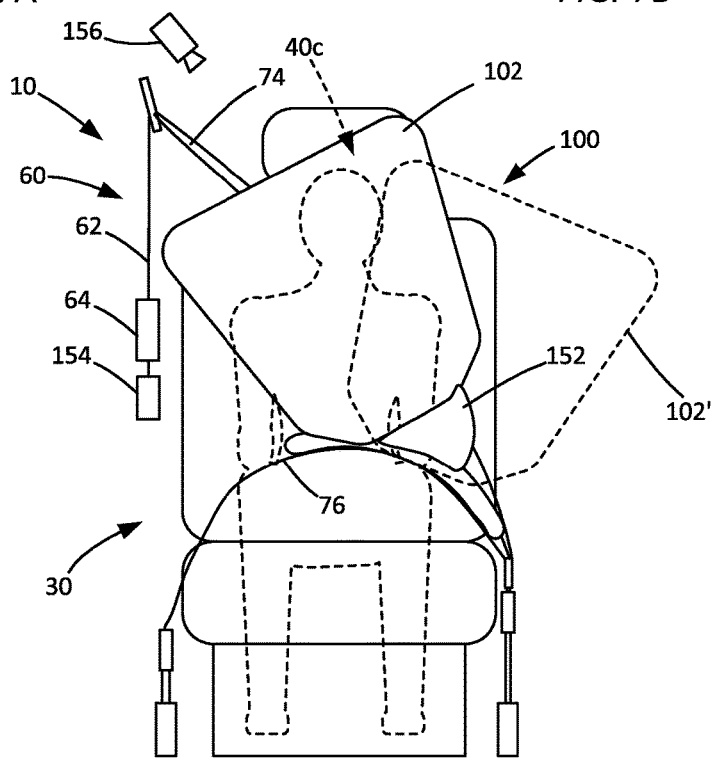

FIGS. 7A-7C illustrate an example configuration of the safety system 10 in scenarios where different sized occupants 40 are seated on the vehicle seat 30, restrained by the seatbelt 60, and protected by the airbag 102. FIG. 7A illustrates the system 10 protecting a normally sized occupant 40a, such as a 50% male occupant. FIG. 7B illustrates the system 10 protecting a large occupant 40b, such as a 95% male occupant. FIG. 7C illustrates the system 10 protecting a small occupant 40c, such as a 5% female occupant.

The safety system 10 can be configured so that the airbag 102 covers, i.e., provides cushioning protection for, the normally sized occupant 40a of FIG. 7A. As such, the airbag module 100 can be connected to the lap belt 76 at a location selected to position the airbag 102 centered with respect to the occupant 40a, as shown in FIG. 7A. As a result, when the occupant 40 is not a normally sized occupant, the resulting position of the airbag module 100 on the lap belt 76 changes.

As a result, in the case of a large occupant 40b (FIG. 7B), the location of the airbag module 100 on the lap belt 76 shifts laterally relative to the occupant 40b and the seat 30, to the left as viewed in FIG. 7B. As a result, the airbag 102 deploys from the shifted airbag module location and is positioned offset to the left and rotated counterclockwise, as indicated generally by the airbag illustrated in dashed lines at 102' in FIG. 7B.

In the case of a small occupant 40c (FIG. 7C), the location of the airbag module 100 on the lap belt 76 shifts laterally relative to the occupant 40c and the seat 30, to the left as viewed in FIG. 7C. As a result, the airbag 102 deploys from the shifted airbag module location and is positioned offset to the left and rotated clockwise, as indicated generally by the airbag illustrated in dashed lines at 102' in FIG. 7C.

To help counteract this shifting and rotation in the cases of small and large occupants, the safety system 10 includes adaptive devices in the form of inflatable positioning chambers configured to shift the position of the airbag 102 in order to help improve airbag coverage for these occupants. Referring to FIG. 7B, the airbag module 100 includes a positioning chamber 150 that is inflatable between the lap belt 76 and a lateral (left) portion of the airbag 102 to pivot or rotate the airbag 102 clockwise in order to compensate for the counterclockwise rotation of the airbag shown at 102'. As shown in FIG. 7B, the positioning chamber 150 can rotate the airbag 102 such that its position is rotated clockwise beyond the non-rotated state (see, FIG. 7A) in order to maximize the airbag coverage of the large occupant 40b. Because of this over-rotation, airbag coverage of a majority of the large occupant's head and torso can be maintained.

Referring to FIG. 7C, the airbag module 100 also includes a positioning chamber 152 that is inflatable between the lap belt 76 and a lateral (right) portion of the airbag 102 to pivot or rotate the airbag 102 counter clockwise in order to compensate for the clockwise rotation of the airbag shown at 102'. As shown in FIG. 7C, the positioning chamber 152 can rotate the airbag 102 such that its position is rotated counterclockwise beyond the non-rotated state (see, FIG. 7A) in order to maximize the airbag coverage of the small occupant 40c. Because of this over-rotation, airbag coverage of a majority of the small occupant's head and torso can be maintained.

The positioning chambers 150, 152 can have a variety of configurations. For example, the chambers 150, 152 can be separate airbags secured to the airbag 102 by connections, such as stitching. As another example, the chambers 150, 152 can be separately inflatable chambers of the airbag 102 itself. In either example configuration, a separate inflator can inflate the chambers 150, 152, or a valve can be actuated to direct inflation fluid from the inflator 110 into the chambers.

Regardless of how the positioning chambers 150, 152 are implemented, the safety system 10 is adapted to recognize the occupant size, so that a determination can be made (e.g., via the ACU 14) as to when to inflate and deploy the positioning chambers. Occupant size sensing can be implemented in a variety of manners. For example, the retractor 64 can be fitted with a payout sensor 154 that senses the amount of seatbelt webbing 62 paid out by the retractor. Provided with this measurement, the ACU 14 can make a determination as to the size of the occupant 40 and choose to deploy the chambers 150, 152 accordingly. As another example, the safety system 10 can employ the use of a camera 156 to view and classify the occupant 40 as being normally sized, small, or large. The ACU 14 determine whether to deploy the chambers 150, 152 based on this classification.

Figure 8A:
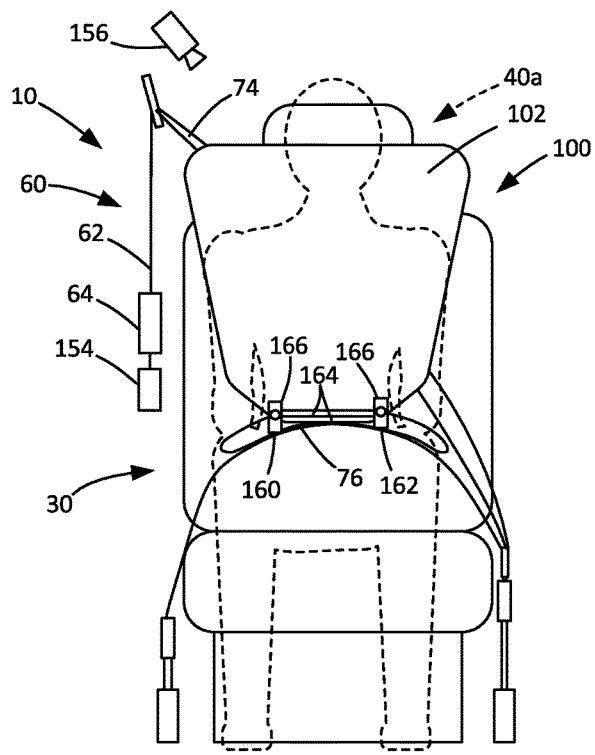
FIGS. 8A-8C are schematic illustrations depicting example deployment conditions of the apparatus, according to another example configuration.
Figure 8B:
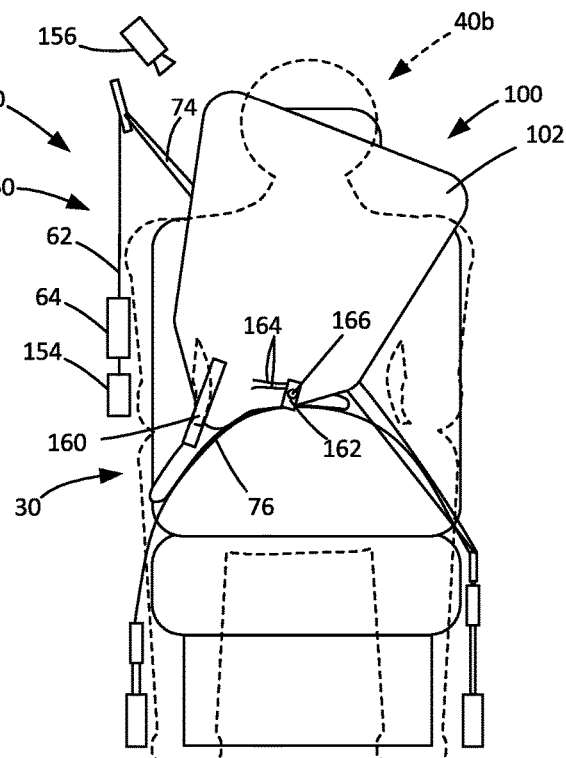
Figure 8C:
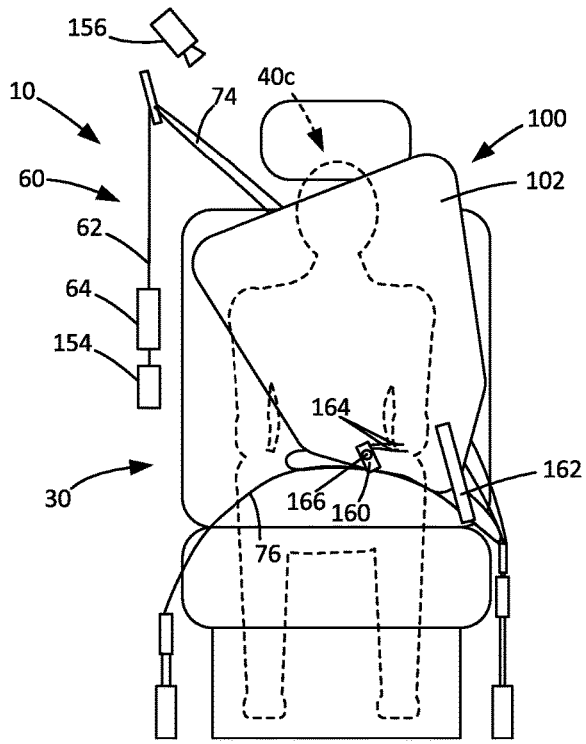

FIGS. 8A-8C illustrate an example configuration of the safety system 10 in scenarios where different sized occupants 40 are seated on the vehicle seat 30, restrained by the seatbelt 60, and protected by the airbag 102. FIG. 8A illustrates the system 10 protecting a normally sized occupant 40a, such as a 50% male occupant. FIG. 8B illustrates the system 10 protecting a large occupant 40b, such as a 95% male occupant. FIG. 8C illustrates the system 10 protecting a small occupant 40c, such as a 5% female occupant.

The safety system 10 can be configured so that the airbag 102 covers, i.e., provides cushioning protection for, the normally sized occupant 40a of FIG. 8A. As such, the airbag module 100 can be connected to the lap belt 76 at a location selected to position the airbag 102 centered with respect to the occupant 40a, as shown in FIG. 8A. As a result, when the occupant 40 is not a normally sized occupant, the resulting position of the airbag module 100 on the lap belt 76 changes.

As a result, in the case of a large occupant 40b (FIG. 8B), the location of the airbag module 100 on the lap belt 76 shifts laterally relative to the occupant 40b and the seat 30, to the left as viewed in FIG. 8B. As a result, the airbag 102 deploys from the shifted airbag module location and is positioned offset to the left and rotated counterclockwise, as indicated generally by the airbag illustrated in dashed lines at 102' in FIG. 8B.

In the case of a small occupant 40c (FIG. 8C), the location of the airbag module 100 on the lap belt 76 shifts laterally relative to the occupant 40c and the seat 30, to the right as viewed in FIG. 8C. As a result, the airbag 102 deploys from the shifted airbag module location and is positioned offset to the right and rotated clockwise, as indicated generally by the airbag illustrated in dashed lines at 102' in FIG. 8C.

To help counteract this shifting and rotation in the cases of small and large occupants, the safety system 10 includes adaptive devices in the form of actuatable tethers 160, 162 that restrain deployment of the airbag 102 in the area of its connection with the lap belt 76. The tethers 160, 162 are actuatable to release the connection with the airbag 102, which permits that portion of the airbag to deploy further, which shifts the position of the airbag 102 in order to help improve airbag coverage for these occupants. In the example configuration of FIG. 8A, the tethers 160, 162 enforce pleats 164 in the airbag 102 when both tethers are in the non-released condition. In the case of the normally sized occupant 40a (FIG. 8A), maintaining the tethers 160, 162 in the connected condition maintains the pleats 164 adjacent the connection of the airbag 102 to the lap belt 76.

Referring to FIG. 8B, in the case of the large occupant 40b, the tether 160 is released, which permits the pleats 164 adjacent the released tether to unfold and allows that portion of the airbag 102 to inflate and deploy. At the same time, the pleats 164 adjacent the unreleased tether 162 are maintained. The unfolding of the pleats 164 and the subsequent unfolding and deployment of the pleated portion of the airbag 102, combined with the maintained, non-released condition of the pleat 164, causes the airbag 102 to pivot or rotate clockwise in order to compensate for the counterclockwise rotation of the airbag shown at resulting from the large occupant (see also, airbag 102' of FIG. 7B). As shown in FIG. 8B, the resulting position of the airbag 102 is that it is rotated clockwise beyond the non-rotated state (see, FIG. 8A), which maximizes the airbag coverage of the large occupant 40b. Because of this over-rotation, airbag coverage of a majority of the large occupant's head and torso can be maintained.

Referring to FIG. 8C, in the case of the small occupant 40c, the tether 162 is released, which permits the pleats 164 adjacent the released tether to unfold and allows that portion of the airbag 102 to inflate and deploy. At the same time, the pleats 164 adjacent the unreleased tether 160 are maintained. The unfolding of the pleats 164 and the subsequent unfolding and deployment of the pleated portion of the airbag 102, combined with the maintained, non-released condition of the pleat 162, causes the airbag 102 to pivot or rotate counterclockwise in order to compensate for the clockwise rotation of the airbag resulting from the small occupant (see also, airbag 102' of FIG. 7C). As shown in FIG. 8C, the resulting position of the airbag 102 is that it is rotated counterclockwise beyond the non-rotated state (see, FIG. 8A), which maximizes the airbag coverage of the small occupant 40c. Because of this over-rotation, airbag coverage of a majority of the small occupant's head and torso can be maintained.

The tethers 160, 162 can be configured to release, for example, through the use of a device 166, such as a solenoid or fastener, that is actuatable to release its connection of the airbag 102 to the lap belt 76. The safety system 10 is adapted to recognize the occupant size, so that a determination can be made (e.g., via the ACU 14) as to which, if any, of the tethers 160, 162 to release. Occupant size sensing can be implemented in a variety of manners. For example, the retractor 64 can be fitted with a payout sensor 154 that senses the amount of seatbelt webbing 62 paid out by the retractor. Provided with this measurement, the ACU 14 can make a determination as to the size of the occupant 40 and choose whether to actuate the device 166 to release a tether 160, 162 accordingly. As another example, the safety system 10 can employ the use of a camera 156 to view and classify the occupant 40 as being normally sized, small, or large. The ACU 14 determine whether to release a tether 160, 162 based on this classification.

Figure 9A:
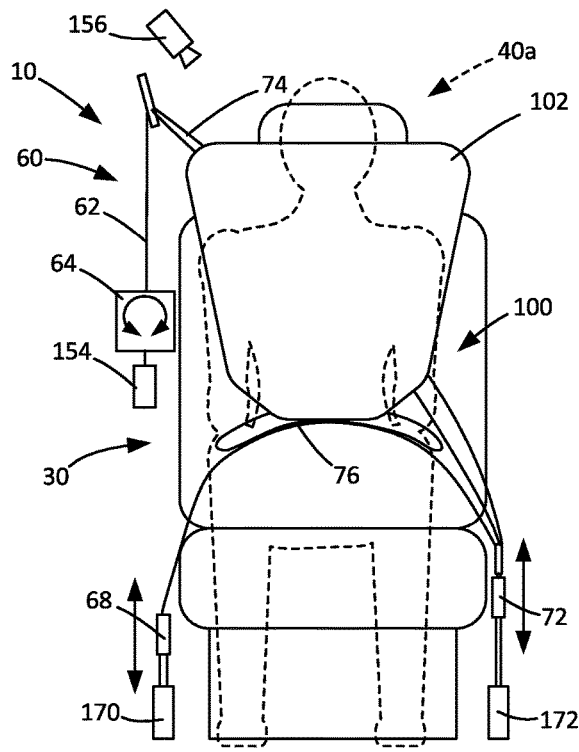
FIGS. 9A-9C are schematic illustrations depicting example deployment conditions of the apparatus, according to another example configuration.
Figure 9B:
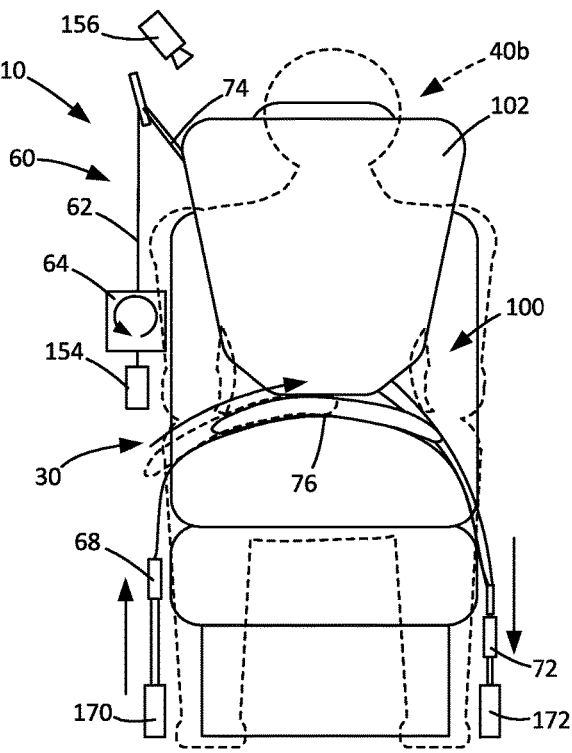
Figure 9C:
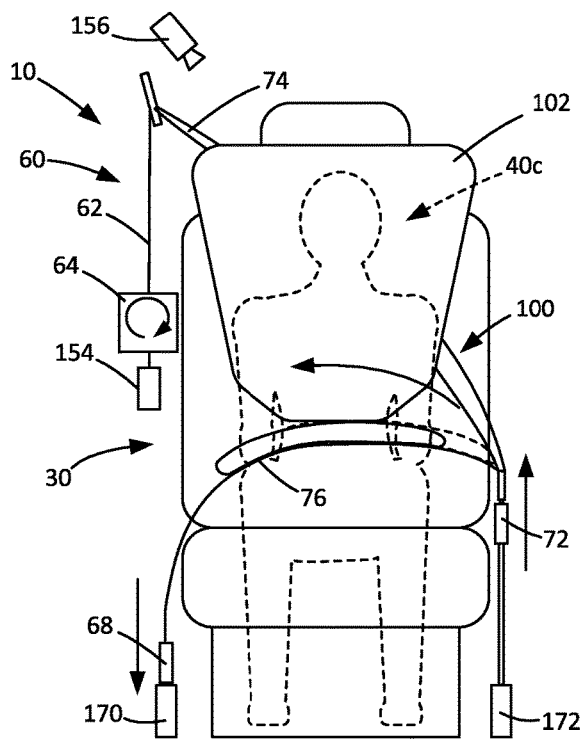

FIGS. 9A-9C illustrate an example configuration of the safety system 10 in scenarios where different sized occupants 40 are seated on the vehicle seat 30, restrained by the seatbelt 60, and protected by the airbag 102. FIG. 9A illustrates the system 10 protecting a normally sized occupant 40a, such as a 50% male occupant. FIG. 9B illustrates the system 10 protecting a large occupant 40b, such as a 95% male occupant. FIG. 9C illustrates the system 10 protecting a small occupant 40c, such as a 5% female occupant.

The safety system 10 can be configured so that the airbag 102 covers, i.e., provides cushioning protection for, the normally sized occupant 40a of FIG. 9A. As such, the airbag module 100 can be connected to the lap belt 76 at a location selected to position the airbag 102 centered with respect to the occupant 40a, as shown in FIG. 9A. As a result, when the occupant 40 is not a normally sized occupant, the resulting position of the airbag module 100 on the lap belt 76 changes.

As a result, in the case of a large occupant 40b (FIG. 9B), the location of the airbag module 100 on the lap belt 76 shifts laterally relative to the occupant 40b and the seat 30, to the left as viewed in FIG. 9B, to the position illustrated in dashed lines at 100'. As a result, the airbag 102 would deploy from the shifted airbag module location and is positioned offset to the left and rotated counterclockwise. This position is shown in previously described FIG. 8B by the airbag illustrated in dashed lines at 102'.

In the case of a small occupant 40c (FIG. 9C), the location of the airbag module 100 on the lap belt 76 shifts laterally relative to the occupant 40c and the seat 30, to the right as viewed in FIG. 9C, to the position illustrated in dashed lines at 100'. As a result, the airbag 102 deploys from the shifted airbag module location and is positioned offset to the right and rotated clockwise. This position is shown in previously described FIG. 8C by the airbag illustrated in dashed lines at 102'.

To help counteract this shifting and rotation in the cases of small and large occupants, the safety system 10 includes adaptive devices in the form of actuatable features for adjusting the position of the seatbelt and the airbag module 100 based on the sensed occupant size. The system 10 can include one or more of an actuatable seatbelt retractor 64, an actuatable seatbelt anchor 68, and an actuatable seatbelt latch 72.

The actuatable seatbelt retractor 64 includes a mechanism, such as an electric motor, that is actuatable to payout or windup the seatbelt webbing 62. The actuatable seatbelt anchor 68 includes a mechanism 170, such as a servo motor actuated track mechanism, that adjusts the position of the anchor up and down relative to the seat 30. Similarly, the actuatable seatbelt latch 72 includes a mechanism 172, such as a servo motor actuated track mechanism, that adjusts the position of the latch up and down relative to the seat 30.

The actuatable seatbelt retractor 64 and latch 72 have a normal position, illustrated in FIG. 9A, that is assumed in the case of the normal sized occupant 40a. Since the normal sized occupant 40a results in a desired position of the airbag module 100, no adjustment is required, and the airbag 102 inflates to the desired position relative to the occupant 40a.

Referring to FIG. 9B, in the case of the large occupant 40b, the retractor 64 would would payout more webbing than 62 it would for the normal sized occupant 40a, and the result is the shifted airbag module 100'. To account for this, in response to sensing the large occupant 40b, the system 10, i.e., ACU 12, can take the following actions to adjust the position of the airbag module to the centered position illustrated at 100 in FIG. 9B:

Adjust, via the actuator 170, the position of the seatbelt anchor 68 upward relative to the seat 30.

Adjust, via the actuator 172, the position of the seatbelt latch 72 downward relative to the seat 30.

To account for the adjusted position of the anchor 68 and latch 72, the retractor 64 will wind up the seatbelt webbing 62 until the desired snug seatbelt 60 fit is achieved.

Referring to FIG. 9C, in the case of the small occupant 40c, the retractor 64 would not payout as much webbing 62 as it would for the normal sized occupant 40a, and the result is the shifted airbag module 100'. To account for this, in response to sensing the small occupant 40c, the system 10, i.e., ACU 12, can take the following actions to adjust the position of the airbag module to the centered position illustrated at 100 in FIG. 9C:

Adjust, via the actuator 170, the position of the seatbelt anchor 68 downward relative to the seat 30.

Adjust, via the actuator 172, the position of the seatbelt latch 72 upward relative to the seat 30.

To account for the adjusted position of the anchor 68 and latch 72, the retractor 64 will payout the seatbelt webbing 62 so that the desired snug seatbelt 60 fit is achieved.

Advantageously, the actuatable retractor 64 can windup or payout seatbelt webbing 62 to account for the adjusted positions of the anchor 68 and/or latch 72. Therefore, the safety system 10 can maintain proper positioning of the seatbelt mounted airbag module 100 regardless of occupant size.

As another configuration for helping to counteract this shifting and rotation in the cases of small and large occupants, the safety system 10 of FIGS. 9A-C can include adaptive devices in the form of actuatable features for adjusting the position of the seatbelt and the airbag module 100 based on the sensed occupant size. The system 10 can include one or more of a pre-tensioning seatbelt retractor 64, an pre-tensioning seatbelt anchor 68, and a pre-tensioning seatbelt latch 72.

The pre-tensioning seatbelt retractor 64 includes a mechanism, such as a pyrotechnic piston-cylinder pre-tensioner, that is actuatable to windup the seatbelt webbing 62. The pre-tensioning seatbelt anchor 68 includes a mechanism 170, such as a pyrotechnic piston-cylinder mechanism, that adjusts the position of the anchor down relative to the seat 30. Similarly, the pre-tensioning seatbelt latch 72 includes a mechanism 172, such as a pyrotechnic piston-cylinder mechanism, that adjusts the position of the latch down relative to the seat 30.

The pre-tensioning seatbelt retractor 64 and latch 72 have a normal position, illustrated in FIG. 9A, that is assumed in the case of the normal sized occupant 40a. Since the normal sized occupant 40a results in a desired position of the airbag module 100, the pre-tensioning seat belt anchor 68, and pre-tensioning seat belt latch 72 (or pre-tensioning seat belt retractor 64) can be activated together or not at all, and the airbag 102 inflates to the desired position relative to the occupant 40a.

Referring to FIG. 9B, in the case of the large occupant 40b, at the time of the crash, the pre-tensioning seat belt latch 72 (or pre-tensioning seat belt retractor 64) would be activated first. The pre-tensioning seat belt anchor 68 would be activated second or not at all. This results in the airbag module 100' shifted toward the seat belt latch 72 and into a position more centered on the occupant 40b.

Referring to FIG. 9C, in the case of the small occupant 40c, at the time of the crash, the pre-tensioning seat belt anchor 68 would be activated first. The pre-tensioning seat belt latch 72 (or pre-tensioning seat belt retractor 64) would be activated second, or not at all. This results in the airbag module 100' shifted toward the seat belt anchor 68 and into a position more centered on the occupant 40c.

The safety system 10 is adapted to recognize the occupant size, so that a determination can be made (e.g., via the ACU 14) as to which of the aforementioned steps are necessary to center the airbag module 100. Occupant size sensing can be implemented in a variety of manners. For example, the retractor 64 can be fitted with a payout sensor 154 that senses the amount of seatbelt webbing 62 paid out by the retractor. Provided with this measurement, the ACU 14 can make a determination as to the size of the occupant 40 and choose whether to adjust the anchor 68 and latch 72 accordingly. As another example, the safety system 10 can employ the use of a camera 156 to view and classify the occupant 40 as being normally sized, small, or large. The ACU 14 determine whether to adjust the anchor 68 and latch 72 based on this classification.

Figure 10:
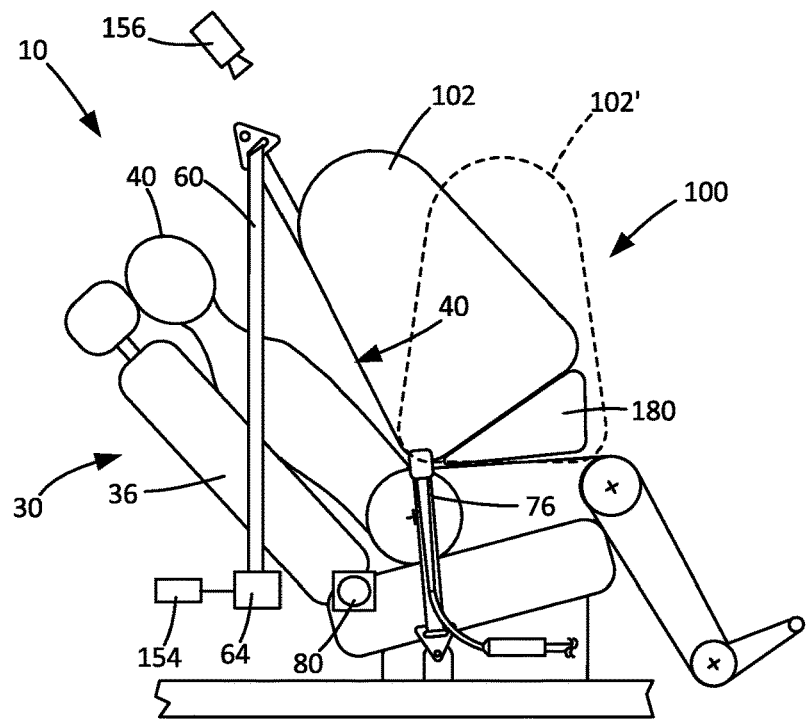
FIG. 10 is a schematic illustration depicting an deployment condition of the apparatus, according to another example configuration.

FIG. 10 illustrates an example configuration of the safety system 10 in the scenario of an occupant 40 on the vehicle seat 30 with the seatback 36 reclined, restrained by the seatbelt 60, and protected by the airbag 102. In this scenario, the normally inflated and deployed airbag, illustrated in dashed lines at 102', results in significant space between the reclined occupant 40 and the airbag. According to the example configuration of FIG. 10, the safety system 10 can be configured to shift, i.e., rotate the airbag back toward the reclined occupant 40 so as to close this space.

To do this, the airbag module 100 can include an inflatable positioning chamber 180 configured to shift, i.e., rotate the airbag 102 back toward the reclined occupant 40. The positioning chamber 180 is inflatable between the legs 50 and the airbag 102 to pivot or rotate the airbag counter-clockwise to the position illustrated in solid lines at 102 in FIG. 10 in order to compensate for the space created by the reclined occupant 40. For example, the positioning chamber 180 can have a wedge-shaped configuration tapered thickto-thin from front-to-rear, as shown in FIG. 10, to achieve the desired rotation toward the occupant 40.

The positioning chamber 180 can have a variety of configurations. For example, the chamber 180 can be a separate airbag secured to the airbag 102 by connections, such as stitching. As another example, the chambers 180 can be one or more separately inflatable chambers of the airbag 102 itself. In either example configuration, a separate inflator can inflate the chamber(s) 180 or a valve can be actuated to direct inflation fluid from the inflator 110 into the chambers.

Regardless of how the positioning chamber 180 is implemented, the safety system 10 is adapted to recognize the angle of the seatback 36, so that a determination can be made (e.g., via the ACU 14) as to when to inflate and deploy the positioning chamber. Seatback angle sensing can be implemented in a variety of manners. For example, the seatback 36 can be fitted with an angle sensor 80 that senses the seatback angle. Provided with this measurement, the ACU 14 can make a determination as to the angle of the seatback 36 and choose to deploy the chamber 180 accordingly. As another example, the safety system 10 can employ the use of a camera 156 to view and classify the seatback 36 angle as being reclined. The ACU 14 can determine whether to deploy the chamber 150 based on this classification.

Airbag Chamber Configuration

Figure 11:
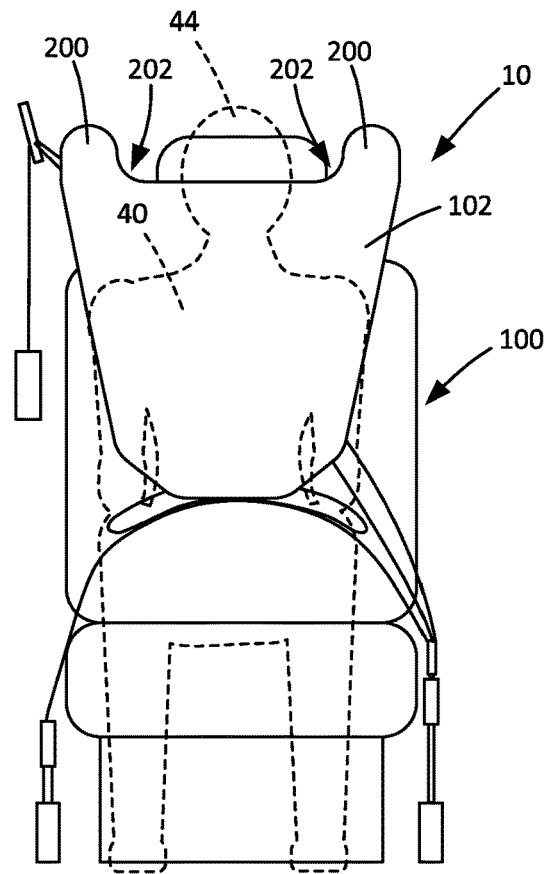
FIG. 11 is a schematic illustration depicting a deployed condition of the apparatus, according to another example configuration.

The airbag 102 configurations illustrated in FIGS. 1-10 are for purposes of example. The airbag 102 can have a variety of chamber configurations. For example, referring to FIG. 11, the airbag 102 can include chambers 200 at the top of the airbag configured to help protect the occupant 40 in the case of an angled or oblique impact that results in the occupant moving forward obliquely, i.e., at an angle, into engagement with the airbag. The extensions can offer extended coverage in the event that the occupant 40, moving obliquely or at an angle into contact with the airbag 102 will not "slide off" the bag. Instead, the extensions 200 can receive and cushion the occupant's head 44. To help ensure this, the chambers 200 are configured to form pockets 202 for receiving the occupant 40, especially the occupant's head 44, which maintains the position of the airbag 102 relative to the occupant so that it covers the occupant despite the oblique occupant movement.

Figure 12A:
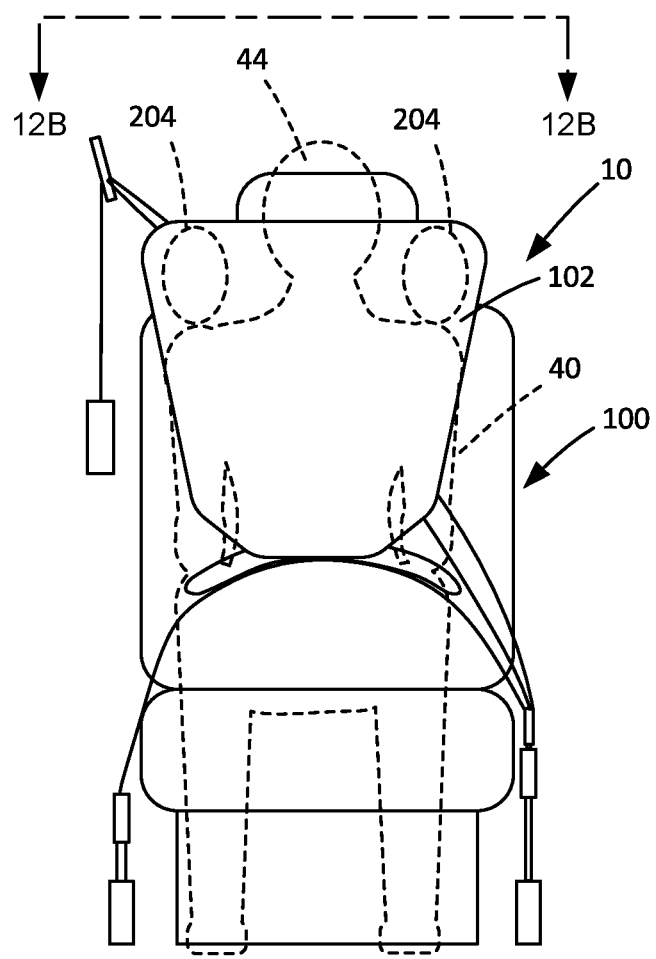
FIG. 12A is a schematic illustration depicting a deployed condition of the apparatus, according to another example configuration.
Figure 12B:
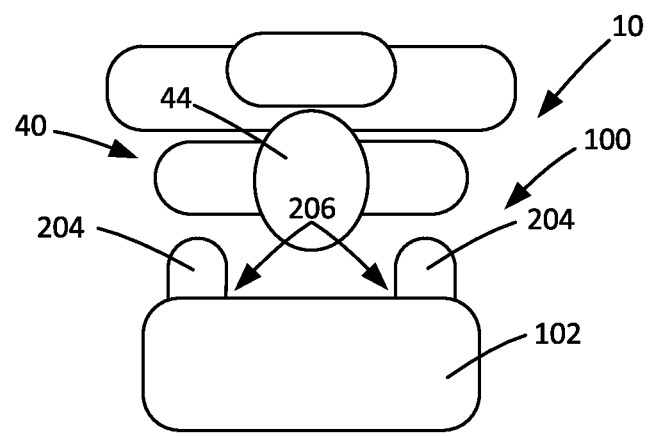
FIG. 12B is a top view of the apparatus taken generally along line 12B-12B in FIG. 12A.

As another example, referring to FIGS. 12A-B, the airbag 102 can include chambers 204, located at the top corners of the airbag, configured to help protect the occupant 40 in the case of an angled or oblique impact that results in the occupant moving forward obliquely, i.e., at an angle, into engagement with the airbag. The chambers 204 extend rearward from the main portion/chamber(s) of the airbag 102, forming pockets 206 for receiving the occupant 40, especially the occupant's head 44. The chambers 204 offer extended coverage in the event that the occupant 40, moving obliquely or at an angle into contact with the airbag 102 will not "slide off" the bag. Instead, the occupant 40 is received retained in the pocket 206 so that the main portion of the airbag 102 covers the occupant despite the oblique occupant movement which, along with the chambers 204, can offer protection from impacts with the vehicle.

Active and Passive Venting

Figure 13A:
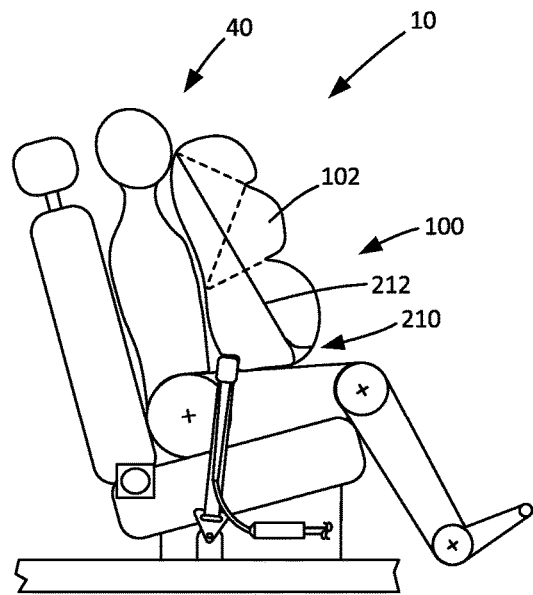
FIGS. 13A and 13B are schematic illustrations depicting deployed conditions of the apparatus, according to another example configuration.
Figure 13B:
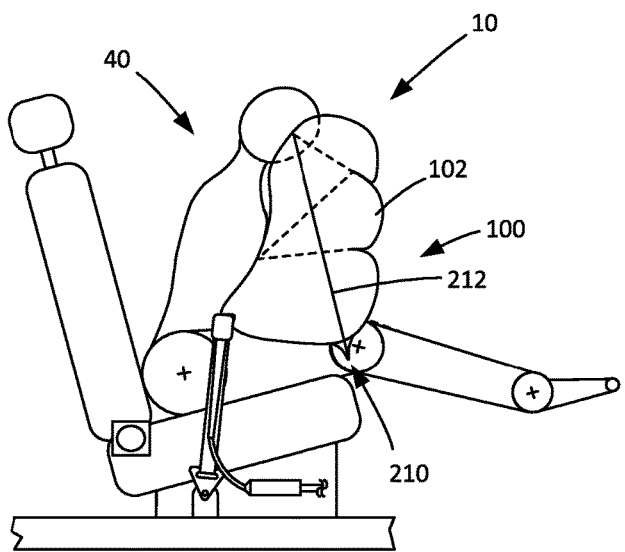

The airbag 102 can include active and/or passive venting features. Passive venting features are illustrated in FIGS. 13A-B. As shown in FIG. 13A, the airbag 102 includes a passive vent 210. In this configuration, the vent 210 is actuated by a tether 212 configured to actuate the vent 210 in response to the occupant 40 impacting the airbag 102. In FIG. 13A, the vent 210 is unactuated. The tether 212 is tensioned in response to airbag inflation, which maintains the vent 210 in the unactuated condition. In FIG. 13B, the vent 210 is actuated due to the occupant 40 impacting the airbag 102 and causing tension in the tether 212 to be released.

Figure 14:
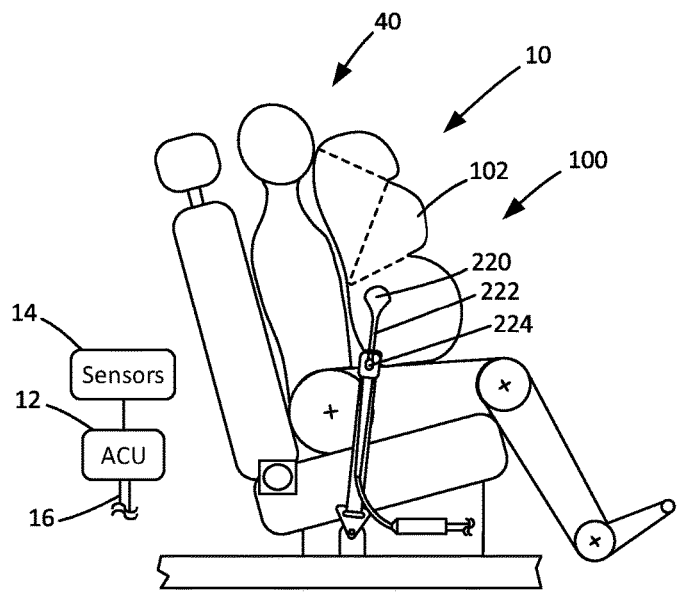
FIG. 14 is a schematic illustration depicting a deployed condition of the apparatus, according to another example configuration.

FIG. 14 illustrates an airbag 102 that includes an active vent 220. The vent 220 is actuated via a tether 222 connected to an actuatable device 224, such as an actuatable fastener, that is actuatable to release the tether 222. In the active vent configuration of FIG. 14, actuation of the vent 220 does not depend on the position of the occupant 40 or impacts with the airbag 102. Actuation of the vent 220 is controlled through the actuatable device 224, which is controlled by the safety system 10, e.g., the ACU 12, in response to sensed vehicle and/or occupant conditions. These sensed conditions can, for example, be sensed seat positions, seat weights, occupant size, crash severity, etc. In a non-actuated condition, the actuatable device 224 maintains the connection of the tether 222. In the actuated condition, the actuatable device 224 releases the tether 222.

The vents 210, 220 can have a variety of configurations. For example, the vents 210, 220 can be normally closed vents in which inflation fluid venting is blocked in the non-actuated condition, and fluid venting is permitted in the actuated condition. Alternatively, the vents 210, 220 can be normally opened vents in which inflation fluid venting is permitted in the non-actuated condition, and fluid venting is blocked in the actuated condition. Either vent configuration can be implemented in the example configurations of FIGS. 13A, 13B, and 14.

A normally open vent configuration is illustrated in FIGS. 15A-B. The vent 210, 220 can be actuated via tether 212, 222 either passively (FIGS. 13A-B) or actively (FIG. 14). The vent 210, 220 is configured to selectively permit and/or block inflation fluid flow through a vent opening 232 in an airbag wall 230. The vent 210, 220 of FIGS. 15A-B includes a cuff 234 that is connected to the airbag wall 230 and surrounds the opening 232. The cuff 234 has a tapered, frustoconical configuration and extends outside the inflatable volume of the airbag 102.

The vent 210, 220 also includes a vent door 236 that is connected to the cuff 234 and/or the airbag wall 230 at the opening 232. The vent door 236 has a conical form and is configured to fit within and match the frustoconical form of the cuff 234. The vent door 236 includes a plurality of inflation fluid openings 238 along a lower section of the door, and is connected to the tether 212, 222 at the apex of its conical construction.

FIG. 15A illustrates the vent 210, 212 in an open condition, and FIG. 15B illustrates the vent in a closed condition. In the open condition of FIG. 15A, the vent door 236 is positioned outside or away from the vent cuff 234 and permits inflation fluid to vent from the airbag 102 along a path that flows through the openings 238 in the vent door 236, through the opening 232 in the airbag wall 230, and through the cuff 234, as indicated by the arrow in FIG. 15A. In the closed condition of FIG. 15B, the vent door 236 is pushed by pressure into engagement with the cuff 234. In the open condition, the tether 212, 222 is configured to maintain the vent door 236 in the open condition, and to release the vent door to the closed condition. When the tether 212, 222 is released, inflation fluid pressure inside the airbag 102 urges the vent door 236 to the closed condition of FIG. 15B, where the cuff 234 blocks inflation fluid flow through the openings 238 and the vent 210, 220.

A normally closed vent configuration is illustrated in FIGS. 16A-B. The vent 210, 220 can be actuated via tether 212, 222 either passively (FIGS. 13A-B) or actively (FIG. 14). The vent 210, 220 is configured to selectively permit and/or block inflation fluid flow through a vent opening 232 in an airbag wall 230. The vent 210, 220 of FIGS. 15A-B includes a sock 240 that is stitched to the airbag wall 230 and surrounds the opening 232. The sock 240 has a generally tapered, tubular configuration, and includes one or more openings 242. The tether 212, 222 is connected to an end of the sock 240 opposite the vent opening 232, and extends through a tether guide 244 connected to the airbag wall 230.

FIG. 16A illustrates the vent 210, 220 in a closed condition, and FIG. 16B illustrates the vent in an open condition. In the closed condition of FIG. 16A, the sock 240 is pulled downward (as viewed in the figure) along the airbag wall 230 by the tether 212, 222, guided by the tether guide 244. This tensions the sock 240 against the airbag wall 230, which closes the openings 242, placing the vent 210, 220 in the closed condition blocking inflation fluid flow therethrough.

In the open condition of FIG. 16B, the tether 212, 222 is released, which allows the sock 240 to move away from the airbag wall 230 under the pressure of inflation fluid in the airbag 102. This permits inflation fluid to flow out of the airbag 102 through the opening 232 and the openings 242, as indicated generally by the arrows in FIG. 16B.

The vent configurations of FIGS. 15A-B and 16A-B can be implemented passively (i.e., a passive vent 210 implementation, see, e.g., FIGS. 13A-B) or actively (i.e., an active vent 220 implementation, see, e.g., FIG. 14). For example, the normally closed vent construction of FIGS. 15A-B, implemented in the passive configuration of FIGS. 13A-B, would result in the vent 210 being closed (FIG. 15B) in the occupant condition of FIG. 13A and actuated open (FIG. 15A) by the impacting occupant condition of FIG. 13B. As another example, the normally closed vent construction of FIGS. 15A-B, implemented in the active configuration of FIG. 14, would result in the vent 220 being maintained in the open condition of FIG. 15A until the ACU 12 actuates the actuator 224 and releases the vent to the closed condition of FIG. 15B.

As another example, the normally open vent construction of FIGS. 16A-B, implemented in the passive configuration of FIGS. 13A-B, would result in the vent 210 being closed (FIG. 16A) in the occupant condition of FIG. 13A and actuated closed (FIG. 16B) by the impacting occupant condition of FIG. 13B. As a further example, the normally open vent construction of FIGS. 15A-B, implemented in the active configuration of FIG. 14, would result in the vent 210, 220 being maintained in the closed condition of FIG. 16A until the ACU 12 actuates the actuator 224 and releases the vent to the open condition of FIG. 16B.

From the above, it will be appreciated that the safety system 10 can implement an airbag module 100 that incorporates venting that is flexible so as to meet desired criteria. The venting can be actively or passively actuated, and actuation can be configured to permit venting or to block venting.

From the above description of the invention, those skilled in the art will perceive improvements, changes and modifications in the invention. Such improvements, changes and modifications within the skill of the art are intended to be covered by the appended claims.

We claim:

1. A vehicle safety system for helping to protect an occupant of a vehicle seat, comprising:
   a seatbelt extensible around the occupant to help restrain the occupant in the vehicle seat, the seatbelt comprising a lap belt configured to extend across the occupant at the hips;
   an airbag secured to the lap belt and configured to inflate and deploy upward from the lap belt to a deployed position in front of the occupant, wherein the system is configured to actively adjust the deployed position of the airbag relative to the belted occupant in response to the position of the occupant at the time of deployment; and
   an inflator for inflating the airbag, a sensor for sensing the occurrence of an event for which airbag deployment is desired, and a controller operatively connected to the sensor and the inflator, wherein the controller is configured to actuate the inflator in response to the sensor sensing the occurrence of the event for which airbag deployment is desired, wherein the controller is further configured to control the operation of an actuatable device to adjust the deployed position of the airbag in response to the size of the occupant, wherein the actuatable device comprises a positioning chamber inflatable between the airbag and the lap belt to adjust the deployed position of the airbag.

2. The vehicle safety system recited in claim 1, wherein the airbag is connected to the lap belt at a position associated with a normal sized occupant, the system being configured to adjust the deployed position of the airbag in response to detecting a small occupant or a large occupant, wherein the normal size occupant is a 50% male occupant, the small occupant is a 5% female occupant, and the large occupant is a 95% male occupant.

3. The vehicle safety system recited in claim 1, wherein the safety system further comprises one or more devices configured to detect the size of the occupant directly or indirectly and provide an indication of detected occupant size to the controller.

4. The vehicle safety system recited in claim 1, wherein the safety system further comprises a camera system configured to evaluate the size of the occupant and provide an indication of detected occupant size to the controller.

5. The vehicle safety system recited in claim 1, wherein the safety system further comprises a sensor configured to sense seatbelt webbing payout and retraction from a seatbelt retractor, to evaluate the size of the occupant based on seatbelt webbing payout and retraction, and to provide an indication of occupant size to the controller.

6. The vehicle safety system recited in claim 1, wherein the positioning chamber is configured to inflate between the airbag and the lap belt at a lateral position to cause the airbag to rotate relative to the occupant.

7. The vehicle safety system recited in claim 6, wherein the safety system comprises a first positioning chamber configured to inflate between the airbag and the lap belt at a lateral position to cause the airbag to rotate in a first direction relative to the occupant, and a second positioning chamber configured to inflate between the airbag and the lap belt at a lateral position to cause airbag to rotate in a second direction, opposite the first direction, relative to the occupant.

8. The vehicle safety system recited in claim 7, wherein the first positioning chamber is configured to rotate the airbag in the first direction in response to a small occupant of the vehicle seat, and the second positioning chamber is configured to rotate the airbag in the second direction in response to a large occupant of the vehicle seat, wherein the small occupant is a 5% female occupant and the large occupant is a 95% male occupant.

9. The vehicle safety system recited in claim 1, wherein the positioning chamber is configured to inflate between the airbag and the lap belt to cause the airbag to rotate rearward toward a seatback of the vehicle seat in response to the seatback being in a reclined position.

10. The vehicle safety system recited in claim 1, wherein the airbag comprises a base portion secured to the lap belt and an upper portion opposite the base portion and configured to be positioned for receiving a head and upper torso of the occupant when in the deployed position, wherein the upper portion comprises chambers that extend from the upper portion and define a pocket configured to receive an obliquely moving occupant and maintain the position of the airbag so that it covers the occupant despite the oblique occupant movement.

11. The vehicle safety system recited in claim 1, wherein the airbag further comprises a vent configured to vent inflation fluid from the airbag, wherein the vent is configured for active or passive actuation, and wherein the vent has a normally-closed, actuate to open configuration or a normally-open, actuate to close configuration.

12. The vehicle safety system recited in claim 1, wherein the airbag is configured to extend vertically above the seat to a position configured to receive the occupant's head when bending forward in response to a vehicle crash, the airbag having a tapered configuration with a widened base at the connection to the lap belt and a narrowed upper portion configured to receive the occupant's head, wherein the base portion is configured to engage and become pressed against the occupant's legs due to the forward bending of the occupant into engagement with the upper portion of the airbag, and wherein the connection of the base portion to the lap belt maintains the base portion engaging the occupant's legs and lower torso so that the occupant's legs, supported by a bottom cushion and base of the vehicle seat, act as a reaction surface for supporting the airbag against the impacting occupant.

13. The vehicle safety system recited in claim 1, further comprising an internal tether that interconnects an inner surface of an impact panel of the airbag to an inner surface of an outer panel of the airbag, the impact panel being configured to receive the impacting occupant, the outer panel being spaced from and having an outer surface facing away from the occupant, wherein the tether is configured to limit bulging of the outer panel away from the occupant in order to cause impact forces of the occupant to urge the airbag into engagement with the occupant's legs, which acts as a reaction surface for supporting the airbag against the impacting occupant.

14. A vehicle safety system for helping to protect an occupant of a vehicle seat, comprising:
  a seatbelt extensible around the occupant to help restrain the occupant in the vehicle seat, the seatbelt comprising a lap belt configured to extend across the occupant at the hips;
  an airbag secured to the lap belt and configured to inflate and deploy upward from the lap belt to a deployed position in front of the occupant, wherein the system is configured to actively adjust the deployed position of the airbag relative to the belted occupant in response to the position of the occupant at the time of deployment; and
  an inflator for inflating the airbag, a sensor for sensing the occurrence of an event for which airbag deployment is desired, and a controller operatively connected to the sensor and the inflator, wherein the controller is configured to actuate the inflator in response to the sensor sensing the occurrence of the event for which airbag deployment is desired, wherein the controller is further configured to control the operation of an actuatable device to adjust the deployed position of the airbag in response to the size of the occupant, wherein the actuatable device comprises an actuatable tether that connects a base portion of the airbag to the lap belt to maintain pleats in a base portion of the airbag, the tether being actuatable to release the pleats to unfold in response to airbag inflation, which causes the airbag to move relative to the lap belt to adjust the deployed position of the airbag.

15. The vehicle safety system recited in claim 14, wherein the tether is configured to connect a lateral portion of the base portion to the lap belt, the tether being actuatable to extend its length, which releases the pleats adjacent the lateral portion to rotate the airbag relative to the occupant.

16. The vehicle safety system recited in claim 14, wherein the safety system comprises a first tether configured to connect a first lateral portion of the base portion to the lap belt, and a second tether configured to connect a second lateral portion of the base portion, opposite the first lateral portion, to the lap belt, the first tether being actuatable to extend its length, which releases the pleats at the first lateral portion so that the airbag rotates in a first direction relative to the occupant, the second tether being actuatable to extend its length, which releases the pleats at the second lateral portion so that the airbag rotates in a second direction, opposite the first direction, relative to the occupant.

17. The vehicle safety system recited in claim 16, wherein the first tether is configured to rotate the airbag in the first direction in response to a small occupant of the vehicle seat, and the second tether is configured to rotate the airbag in the second direction in response to a large occupant of the vehicle seat, wherein the small occupant is a 5% female occupant and the large occupant is a 95% male occupant.

18. The vehicle safety system recited in claim 14, wherein the airbag is connected to the lap belt at a position associated with a normal sized occupant, the system being configured to adjust the deployed position of the airbag in response to detecting a small occupant or a large occupant, wherein the normal size occupant is a 50% male occupant, the small occupant is a 5% female occupant, and the large occupant is a 95% male occupant.

19. The vehicle safety system recited in claim 14, wherein the safety system further comprises one or more devices configured to detect the size of the occupant directly or indirectly and provide an indication of detected occupant size to the controller.

20. The vehicle safety system recited in claim 14, wherein the safety system further comprises a camera system configured to evaluate the size of the occupant and provide an indication of detected occupant size to the controller.

21. The vehicle safety system recited in claim 14, wherein the safety system further comprises a sensor configured to sense seatbelt webbing payout and retraction from a seatbelt retractor, to evaluate the size of the occupant based on seatbelt webbing payout and retraction, and to provide an indication of occupant size to the controller.

22. The vehicle safety system recited in claim 14, wherein the airbag further comprises a vent configured to vent inflation fluid from the airbag, wherein the vent is configured for active or passive actuation, and wherein the vent has a normally-closed, actuate to open configuration or a normally-open, actuate to close configuration.

23. The vehicle safety system recited in claim 14, wherein the airbag is configured to extend vertically above the seat to a position configured to receive the occupant's head when bending forward in response to a vehicle crash, the airbag having a tapered configuration with a widened base at the connection to the lap belt and a narrowed upper portion configured to receive the occupant's head, wherein the base portion is configured to engage and become pressed against the occupant's legs due to the forward bending of the occupant into engagement with the upper portion of the airbag, and wherein the connection of the base portion to the lap belt maintains the base portion engaging the occupant's legs and lower torso so that the occupant's legs, supported by a bottom cushion and base of the vehicle seat, act as a reaction surface for supporting the airbag against the impacting occupant.

24. The vehicle safety system recited in claim 14, further comprising an internal tether that interconnects an inner surface of an impact panel of the airbag to an inner surface of an outer panel of the airbag, the impact panel being configured to receive the impacting occupant, the outer panel being spaced from and having an outer surface facing away from the occupant, wherein the tether is configured to limit bulging of the outer panel away from the occupant in order to cause impact forces of the occupant to urge the airbag into engagement with the occupant's legs, which acts as a reaction surface for supporting the airbag against the impacting occupant.

25. A vehicle safety system for helping to protect an occupant of a vehicle seat, comprising:
  a seatbelt extensible around the occupant to help restrain the occupant in the vehicle seat, the seatbelt comprising a lap belt configured to extend across the occupant at the hips;
  an airbag secured to the lap belt and configured to inflate and deploy upward from the lap belt to a deployed position in front of the occupant, wherein the system is configured to actively adjust the deployed position of the airbag relative to the belted occupant in response to the position of the occupant at the time of deployment; and
  an inflator for inflating the airbag, a sensor for sensing the occurrence of an event for which airbag deployment is desired, and a controller operatively connected to the sensor and the inflator, wherein the controller is configured to actuate the inflator in response to the sensor sensing the occurrence of the event for which airbag deployment is desired, wherein the controller is further configured to control the operation of an actuatable device to adjust the deployed position of the airbag in response to the size of the occupant, wherein the vehicle safety system further comprises:
  an actuatable seatbelt retractor actuatable to payout and retract seatbelt webbing in response to the controller;
  an actuatable seatbelt anchor for anchoring an end of the seatbelt webbing to the vehicle, the actuatable seatbelt anchor being actuatable to adjust its position relative to the vehicle seat; and
  an actuatable seatbelt latch for receiving a seatbelt buckle to secure the lap belt and shoulder belt extending across the vehicle, the actuatable seatbelt latch being actuatable to adjust its position relative to the vehicle seat;
  wherein the controller is configured to control the actuatable seatbelt retractor, seatbelt anchor, and seatbelt latch to position the airbag in response to the occupant size so that the airbag is centered with respect to the occupant.

26. The vehicle safety system recited in claim 25, wherein the actuatable seatbelt anchor and actuatable seatbelt latch are anchored to the vehicle on opposite sides of the vehicle seat and are actuatable to adjust their respective heights relative to the seat to adjust the position of the lap belt and the airbag secured thereto.

27. The vehicle safety system recited in claim 25, wherein the airbag is connected to the lap belt at a position associated with a normal sized occupant, the system being configured to adjust the deployed position of the airbag in response to detecting a small occupant or a large occupant, wherein the normal size occupant is a 50% male occupant, the small occupant is a 5% female occupant, and the large occupant is a 95% male occupant.

28. The vehicle safety system recited in claim 25, wherein the safety system further comprises one or more devices configured to detect the size of the occupant directly or indirectly and provide an indication of detected occupant size to the controller.

29. The vehicle safety system recited in claim 25, wherein the safety system further comprises a camera system configured to evaluate the size of the occupant and provide an indication of detected occupant size to the controller.

30. The vehicle safety system recited in claim 25, wherein the safety system further comprises a sensor configured to sense seatbelt webbing payout and retraction from a seatbelt retractor, to evaluate the size of the occupant based on seatbelt webbing payout and retraction, and to provide an indication of occupant size to the controller.

31. The vehicle safety system recited in claim 25, wherein the airbag further comprises a vent configured to vent inflation fluid from the airbag, wherein the vent is configured for active or passive actuation, and wherein the vent has a normally-closed, actuate to open configuration or a normally-open, actuate to close configuration.

32. The vehicle safety system recited in claim 25, wherein the airbag is configured to extend vertically above the seat to a position configured to receive the occupant's head when bending forward in response to a vehicle crash, the airbag having a tapered configuration with a widened base at the connection to the lap belt and a narrowed upper portion configured to receive the occupant's head, wherein the base portion is configured to engage and become pressed against the occupant's legs due to the forward bending of the occupant into engagement with the upper portion of the airbag, and wherein the connection of the base portion to the lap belt maintains the base portion engaging the occupant's legs and lower torso so that the occupant's legs, supported by a bottom cushion and base of the vehicle seat, act as a reaction surface for supporting the airbag against the impacting occupant.

33. The vehicle safety system recited in claim 25, further comprising an internal tether that interconnects an inner surface of an impact panel of the airbag to an inner surface of an outer panel of the airbag, the impact panel being configured to receive the impacting occupant, the outer panel being spaced from and having an outer surface facing away from the occupant, wherein the tether is configured to limit bulging of the outer panel away from the occupant in order to cause impact forces of the occupant to urge the airbag into engagement with the occupant's legs, which acts as a reaction surface for supporting the airbag against the impacting occupant.

* * * * *

UNITED STATES PATENT AND TRADEMARK OFFICE
CERTIFICATE OF CORRECTION

| | |
|---|---|
| PATENT NO. | : 11,691,586 B2 |
| APPLICATION NO. | : 17/313244 |
| DATED | : July 4, 2023 |
| INVENTOR(S) | : Fischer et al. |

It is certified that error appears in the above-identified patent and that said Letters Patent is hereby corrected as shown below:

On the Title Page

Item (73) Assignee: Insert --DALPHI METAL ESPANA, S.A., Vigo (ES)
ZF AUTOMOTIVE ITALIA S.R.L., San Giovanni di Ostellato (IT)--

Signed and Sealed this
Twelfth Day of December, 2023

Katherine Kelly Vidal
*Director of the United States Patent and Trademark Office*